United States Patent
Zhang et al.

(10) Patent No.: US 11,758,615 B2
(45) Date of Patent: Sep. 12, 2023

(54) USER EQUIPMENT (UE), EVOLVED NODE-B (ENB) AND METHODS FOR A PACKET CONVERGENCE AND LINK CONTROL (PCLC) LAYER

(71) Applicant: Intel Corporation, Santa Clara, CA (US)

(72) Inventors: Yujian Zhang, Beijing (CN); Mo-Han Fong, Sunnyvale, CA (US); Youn Hyoung Heo, Seoul (KR); Richard C. Burbidge, Shrivenham (GB); Umesh Phuyal, San Diego, CA (US); Candy Yiu, Portland, OR (US); Hong He, Beijing (CN); Sudeep K. Palat, Cheltenham (GB)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/410,611

(22) Filed: Aug. 24, 2021

(65) Prior Publication Data
US 2021/0385906 A1    Dec. 9, 2021

Related U.S. Application Data

(62) Division of application No. 16/088,634, filed as application No. PCT/US2016/052188 on Sep. 16, 2016, now Pat. No. 11,129,233.
(Continued)

(51) Int. Cl.
*H04W 80/08* (2009.01)
*H04W 12/0431* (2021.01)
(Continued)

(52) U.S. Cl.
CPC .......... *H04W 80/08* (2013.01); *H04L 1/1642* (2013.01); *H04W 12/0431* (2021.01);
(Continued)

(58) Field of Classification Search
None
See application file for complete search history.

(56) References Cited

U.S. PATENT DOCUMENTS

| 11,129,233 B2 | 9/2021 | Zhang et al. | |
| 2010/0034169 A1* | 2/2010 | Maheshwari | H04L 47/34 370/350 |

(Continued)

FOREIGN PATENT DOCUMENTS

| WO | WO-2015018653 A1 | 2/2015 |
| WO | WO-2015163593 A1 | 10/2015 |
| WO | WO-2017171919 A1 | 10/2017 |

OTHER PUBLICATIONS

"U.S. Appl. No. 16/088,634, Non Final Office Action dated Dec. 24, 2020", 16 pgs.
(Continued)

*Primary Examiner* — San Htun
(74) *Attorney, Agent, or Firm* — Schwegman Lundberg & Woessner, P.A.

(57) ABSTRACT

Embodiments of a User Equipment (UE), Evolved Node-B (eNB) and methods for communication in accordance with a packet convergence and link control (PCLC) layer are generally described herein. The UE may receive, from a Fifth Generation (5G) eNB, a first group of medium access control (MAC) protocol data units (PDUs) that include PCLC PDUs. In accordance with PCLC sequence numbers (SNs), the UE may reorder the PCLC PDUs and may decipher the PCLC PDUs. The UE may receive, from a legacy eNB, a second group of MAC PDUs that include packet data convergence protocol (PDCP) PDUs encapsu-
(Continued)

lated in radio link control (RLC) PDUs. The UE may reorder the RLC PDUs based on RLC SNs and may decipher the RLC PDUs based on PDCP SNs that are exclusive to the RLC SNs.

12 Claims, 14 Drawing Sheets

Related U.S. Application Data

(60) Provisional application No. 62/316,969, filed on Apr. 1, 2016.

(51) Int. Cl.
   *H04W 80/02* (2009.01)
   *H04L 1/1607* (2023.01)
   *H04W 36/00* (2009.01)
   *H04W 36/30* (2009.01)

(52) U.S. Cl.
   CPC .... *H04W 36/0011* (2013.01); *H04W 36/0022* (2013.01); *H04W 36/305* (2018.08); *H04W 80/02* (2013.01)

(56) References Cited

U.S. PATENT DOCUMENTS

| | | |
|---|---|---|
| 2010/0157904 A1 | 6/2010 | Ho et al. |
| 2012/0155438 A1* | 6/2012 | Shin ............... H04L 1/1841 |
| | | 370/336 |
| 2013/0242859 A1 | 9/2013 | Celik et al. |
| 2015/0043492 A1 | 2/2015 | Baek et al. |
| 2015/0055635 A1 | 2/2015 | Lee et al. |
| 2015/0215987 A1* | 7/2015 | Kim ............... H04L 1/08 |
| | | 370/329 |
| 2016/0044639 A1 | 2/2016 | Yi et al. |
| 2016/0065700 A1* | 3/2016 | Yi ............... H04L 69/04 |
| | | 370/328 |
| 2016/0242080 A1 | 8/2016 | Vikberg et al. |
| 2020/0305225 A1 | 9/2020 | Zhang et al. |

OTHER PUBLICATIONS

"U.S. Appl. No. 16/088,634, Notice of Allowance dated May 19, 2021", 9 pgs.

"U.S. Appl. No. 16/088,634, Response filed Feb. 17, 2021 to Non Final Office Action dated Dec. 24, 2020", 9 pgs.

"U.S. Appl. No. 16/088,634, Response filed Nov. 24, 2020 to Restriction Requirement dated Nov. 5, 2020", 9 pgs.

"U.S. Appl. No. 16/088,634, Restriction Requirement dated Nov. 5, 2020", 9 pgs.

"International Application Serial No. PCT/US2016/052188, International Preliminary Report on Patentability dated Oct. 11, 2018", 9 pgs.

"International Application Serial No. PCT/US2016/052188, International Search Report dated Dec. 26, 2016", 5 pgs.

"International Application Serial No. PCT/US2016/052188, Written Opinion dated Dec. 26, 2016", 7 pgs.

\* cited by examiner

USER EQUIPMENT (UE), EVOLVED NODE-B (ENB) AND METHODS FOR A PACKET CONVERGENCE AND LINK CONTROL (PCLC) LAYER

PRIORITY CLAIM

This application is a divisional of U.S. patent application Ser. No. 16/088,634, filed on Sep. 26, 2018, which is a U.S. National Stage Filing under 35 U.S.C. 371 from International Application No. PCT/US2016/052188, filed Sep. 16, 2016 and published in English as WO 2017/171919 on Oct. 5, 2017, which claims the benefit of priority to U.S. Provisional Patent Application Ser. No. 62/316,969, filed Apr. 1, 2016, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and IEEE (Institute of Electrical and Electronics Engineers) 802.11 wireless local area networks (WLANs), Fifth Generation (5G) networks, and Wireless Gigabit Alliance (Wi-GiG) networks, although the scope of the embodiments is not limited in this respect. Some embodiments relate to hand-off and/or hand-over between networks. Some embodiments relate to various protocol layers, including but not limited to packet data converge protocol (PDCP), radio link control (RLC), medium access control (MAC) and/or others.

BACKGROUND

A mobile network may support communication with mobile devices. In some cases, an increased data rate and/or demand for services may provide various challenges. As an example, an increased number of mobile devices may need to be supported by a base station. As another example, an increased system throughput for the mobile devices may approach or exceed a capacity of the base station. As another example, handover between networks may be challenging. Accordingly, there is a general need for methods and, systems to improve resource efficiency and reduce signaling overhead in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
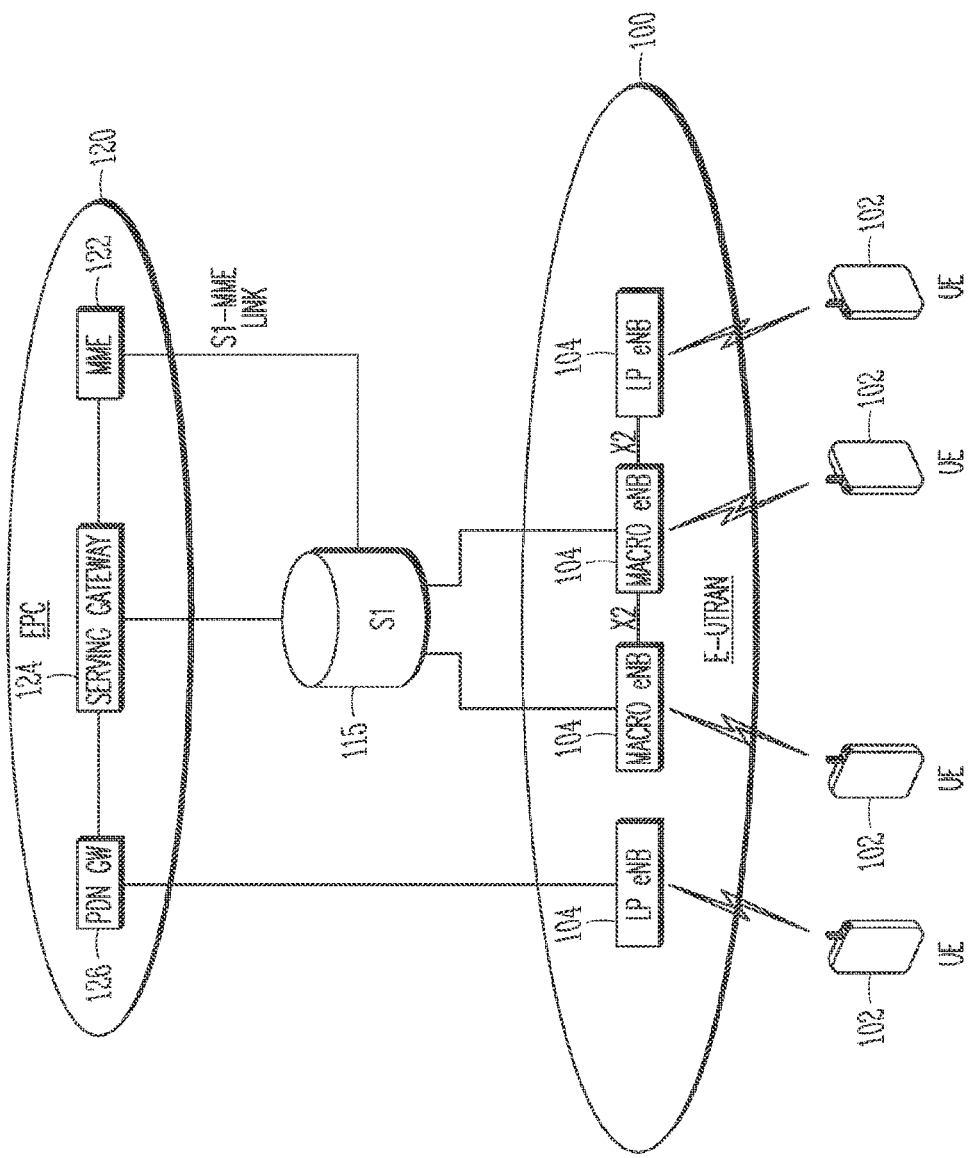
FIG. 1 is a functional diagram of a 3GPP network in accordance with some embodiments.

FIG. 1 is a functional diagram of a 3GPP network in accordance with some embodiments. It should be noted that embodiments are not limited to the example 3GPP network shown in FIG. 1, as other cellular networks and/or other networks may be used in some embodiments. As an example, a Fifth Generation (5G) network may be used in some cases. As another example, a wireless local area network (WLAN) may be used in some cases. Embodiments are not limited to these example networks, however, as other networks may be used in some embodiments. In addition, in some embodiments, one or more networks, including these example networks and/or other networks, may be used in combination. As an example, the UE 102 may be configured to communicate with two networks (such as a 3GPP LTE network and a 5G network), in some embodiments. In addition, handovers between the two networks may be performed, in some cases. It should be noted that the networks of these embodiments and/or other embodiments may include one or more of the components shown in FIG. 1, and may include additional components and/or alternative components in some cases.

The network shown in FIG. 1 may comprise a radio access network (RAN) (e.g., as depicted, the E-UTRAN (evolved universal terrestrial radio access network)) 100 and the core network 120 (e.g., shown as an evolved packet core (EPC)) coupled together through an S1 interface 115. It should be noted that the S1 interface 115 may be a link between an eNB 104 and the MME 122 or S-GW 124. In addition, although multiple eNBs 104 are illustrated in the example of FIG. 1, a separate S1 interface 115 may be used for each eNB 104 to provide a link between the eNB 104 and the MME 122 and/or S-GW 124, in some embodiments. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs also known as micro-, pico-, femto- or small-cell eNBs.

In some embodiments, the UE 102 may receive downlink medium access control (MAC) protocol data units (PDUs) from the eNB 104. The MAC PDUs may be transmitted by the eNB 104 and received by the UE 102 in accordance with a 3GPP protocol and/or other protocol. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information ted back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware, Embodiments described herein may be implemented into a system using any suitably configured hardware and/or software.

Figure 2:
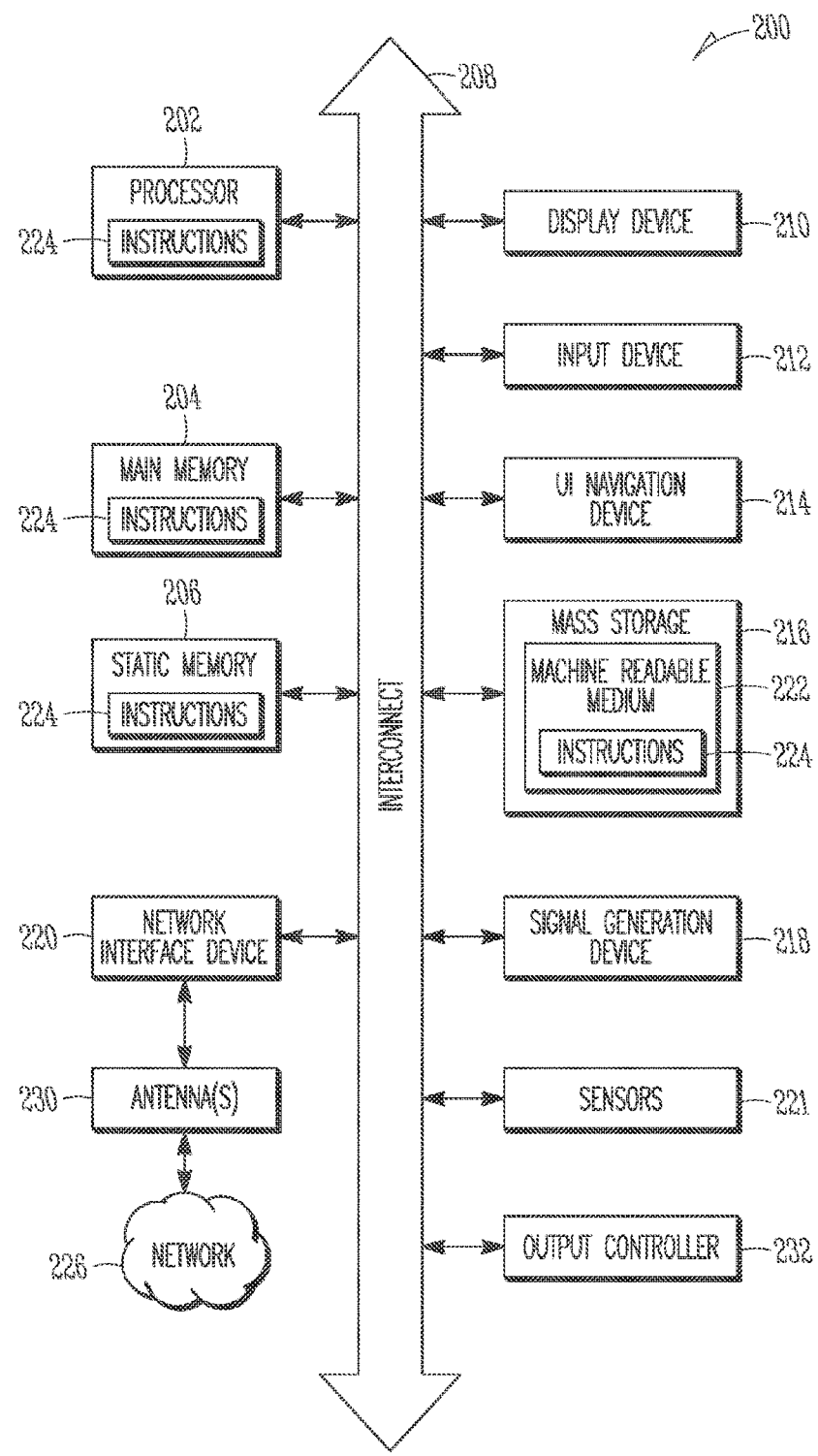
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, access point (AP), station (STA), mobile device, base station, personal computer (PC), a tablet PC, a set-top box (STB), a personal digital assistant (FDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NIT), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MEMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
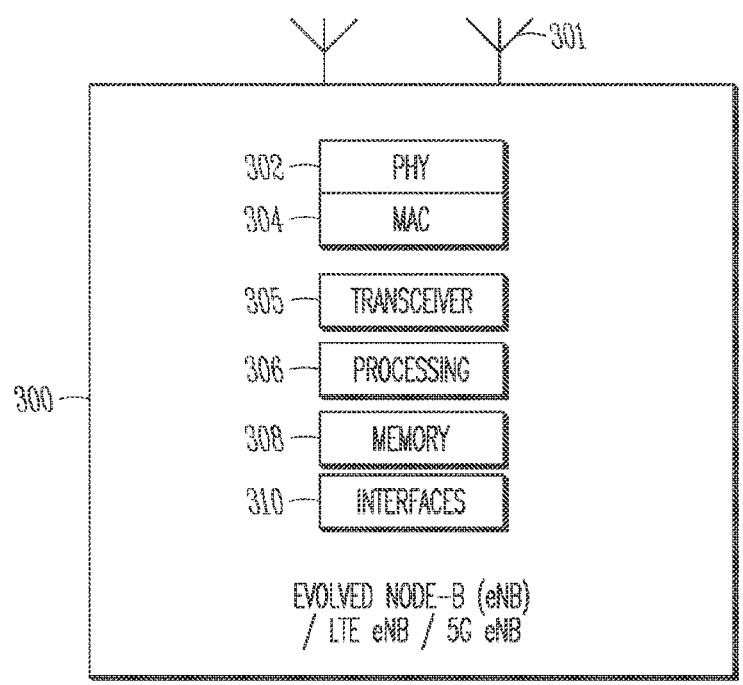
FIG. 3 is a block diagram of an Evolved Node-B (eNB) in accordance with some embodiments.

FIG. 3 is a block diagram of an Evolved Node-B (eNB) ire accordance with some embodiments. It should be noted that in some embodiments, the eNB 300 may be a stationary non-mobile device. The eNB 300 may be suitable for use as an eNB 104 as depicted in FIG. 1, in some embodiments. It should be noted that the eNB 300 may be a legacy eNB 104, a 3GPP LTE eNB (such as 104), a fourth generation (4G) eNB, a 5G eNB and/or other type of eNB or base station.

The eNB 300 may include physical layer circuitry 302 and a transceiver 305, one or both of which may enable transmission and reception of signals to and from the UE 102, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. As an example, the interfaces 310 may enable communication between the eNB 300 and an access point (AP) and/or other component of a WLAN. The interfaces 310 may be wired or wireless or a combination thereof. It should be noted that in some embodiments, an eNB or other base station may include some or all of the components shown in either FIG. 2 or FIG. 3 or both.

Figure 4:
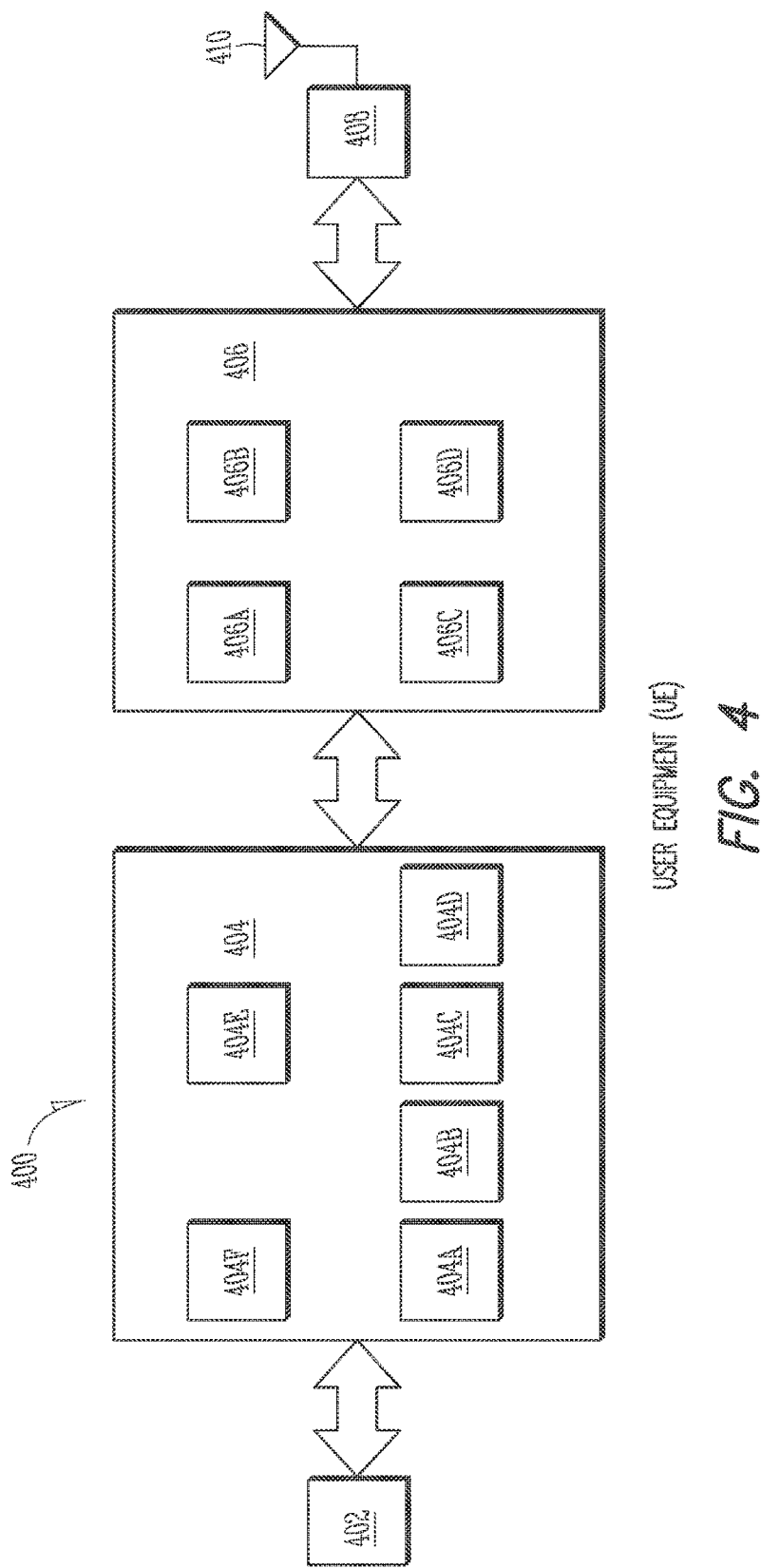
FIG. 4 is a block diagram of a User Equipment (UE) in accordance with some embodiments.

FIG. 4 is a block diagram of a User Equipment (UE) in accordance with some embodiments. The UE 400 may be suitable for use as a UE 102 as depicted in FIG. 1. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, a "transceiver" or "transceiver circuitry" may include one or more elements and/or components, some or all of which may be included in the RF circuitry 406 and/or the FEM circuitry 408. These examples are not limiting, however, as the processing circuitry, the transceiver and/or the transceiver circuitry may also include other elements and/or components in some cases. It should be noted that in some embodiments, a UE or other mobile device may include some or all of the components shown in either FIG. 2 or FIG. 4 or both.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406, For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), preceding, and/or constellation mapping/demapping functionality. In some embodiments, encoding/decoding circuitry of the baseband circuitry 404 may include convolution, tail-biting convolution, turbo, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEW circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer. In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The ELM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

The antennas 230, 301, 410 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 230, 301, 410 may be effectively separated to take advantage of spatial diversity and the different channel characteristics that may result.

In some embodiments, the UE 400 and/or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 400, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 400 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer o one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus for a UE may include various components of the UE 400 and/or the machine 200 as shown in FIGS. 2 and 4. Accordingly, techniques and operations described herein that refer to the UE 400 (or 102) may be applicable to an apparatus for a UE, in some embodiments. In addition, an apparatus for an eNB may include various components of the eNB 300 and/or the machine 200 as shown in FIGS. 3 and 4. Accordingly, techniques and operations described herein that refer to the eNB 300 (or 104) may be applicable to an apparatus for an eNB, in some embodiments.

In accordance with some embodiments, the UE 102 may receive, from a Fifth Generation (5G) eNB 104, a First group of medium access control (MAC) protocol data units (PDUs) that include packet convergence and link control (PCLC) PDUs. In accordance with PCLC sequence numbers (SNs), the UE 102 may reorder the PCLC PDUs and may decipher the PCLC PDUs. The UE 102 may receive, from a legacy eNB 104, a second group of MAC PDUs that include packet data convergence protocol (PDCP) PDUs encapsulated in radio link control (RLC) PDUs. The UE 102 may reorder the RLC PDUs based on RLC SNs and may decipher the RLC PDUs based on PDCP SNs that are exclusive to the RLC SNs. These embodiments are described in more detail below.

It should be noted that the terminology of (Package Convergence and Link Control) layer may be used herein to explain various aspects, concepts and/or techniques of embodiments in which a merged layer is used, but such references are not limiting. Other names or terms may also be used to denote the merged layer without limitation. In some embodiments, the PCLC layer may be considered a merged layer based at least partly on the RLC layer of a legacy protocol and the PDCP layer of the legacy protocol, although the scope of embodiments is not limited in this respect.

Figure 5:
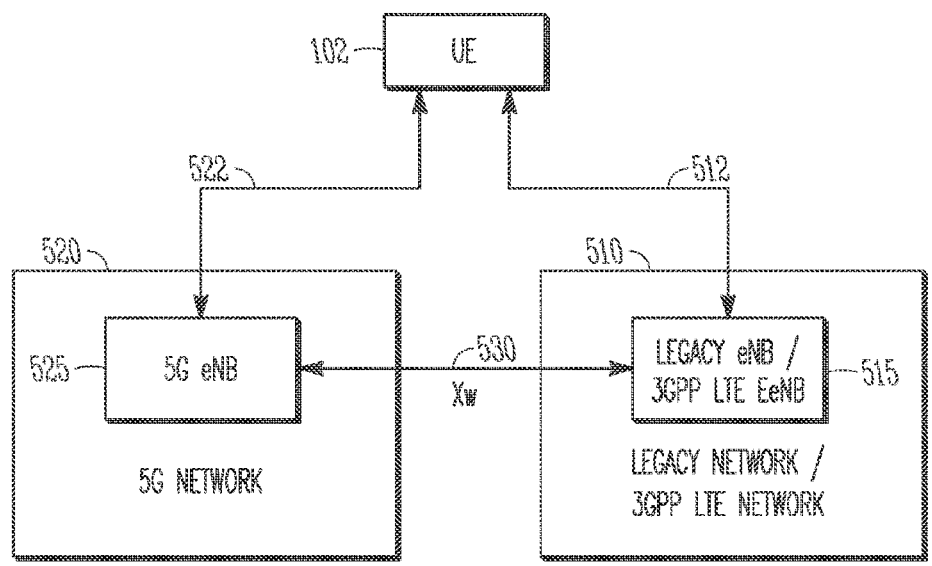
FIG. 5 illustrates an example of connectivity between a UE and eNBs of different networks in accordance with some embodiments.

FIG. 5 illustrates an example of connectivity between a UE and eNBs of different networks in accordance with some embodiments. It should be noted that embodiments are not limited by the example scenario 500 in terms of number, type or arrangement of components, interfaces or networks. It should be noted that embodiments are not limited to usage of the 3GPP LTE network 510 and/or the 5G network 520, as other types of networks may be used, in some cases. Accordingly, references may be made herein to the 3GPP LTE network 510 and/or 5G network 520, such as in descriptions of some operations, techniques and/or methods. However, it is understood that some or all operations, techniques and/or methods described herein may be applicable to embodiments that may include one or more other types of networks, in some cases.

In some embodiments, a legacy network may be a 3GPP LTE network (such as 510) and a legacy eNB may be a 3GPP eNB (such as 515), although the scope of embodiments is not limited in this respect. Accordingly, some operations, methods and/or techniques may be described herein in terms of a legacy network, legacy eNB, legacy protocol and/or other legacy elements. It is understood that such references are not limiting, as those operations, methods and/or techniques may be applicable to embodiments that include other types of networks, eNBs, and protocols (such as 3GPP and/or other).

In some embodiments, the legacy network 510 and/or 3GPP LTE network 510 may include one or more components from FIG. 1 and/or FIG. 5. Accordingly, references herein to usage of a legacy network, 3GPP network and/or 3GPP LTE network may include usage of the 3GPP network shown in FIG. 1, the legacy network 510/3GPP LTE network 510 shown in FIG. 5, other 3GPP networks and/or a combination thereof, in some cases. In some embodiments, the UE 102 may be arranged to communicate with the 5G network 520, to communicate with one or more components from the legacy network 510 3GPP LTE network 510 (in FIG. 5) and/or to communicate with one or more components from the 3GPP network shown in FIG. 1.

In some embodiments, the UE 102 may be arranged to operate in accordance with one or more protocols. The UE 102 may be configured to communicate with multiple networks and/or multiple components in accordance with one or more such protocols, in some cases. Referring to FIG. 5, the UE 102 may communicate with the legacy eNB 515 of the legacy network 515 over the wireless link 512. The LT 102 may communicate with the 5G eNB 525 of the 5G network 520 over the wireless link 522. In some embodiments, the UE 102 may communicate with the 5G eNB 525 in accordance with a 5G protocol and may communicate with the legacy eNB 515 in accordance with a legacy protocol (such as a 3GPP LTE protocol and/or other). The 5G eNB 525 and the legacy eNB 515 may communicate with each other over an interface 530, which may be a wired interface in some cases. The interface 530 may be or may include an Xw interface in some embodiments. However, the scope of embodiments is not limited in this respect, as other interfaces (which may or may not be part of a standard) may be used for communication between the legacy eNB 515 and the 5G eNB 525. In some embodiments, the legacy eNB 515 and the 5G eNB 525 may communicate using wireless techniques or a combination of wired and wireless techniques.

In some embodiments, the UE 102, 5G eNB 525 and/or legacy eNB 515 may be arranged to communicate in accordance with an inter radio access technology (inter-RAT) arrangement (and/or other arrangement) in which the legacy eNB 515 serves as a primary eNB and the 5G eNB 525 serves as a secondary eNB (SeNB).

Figure 6:
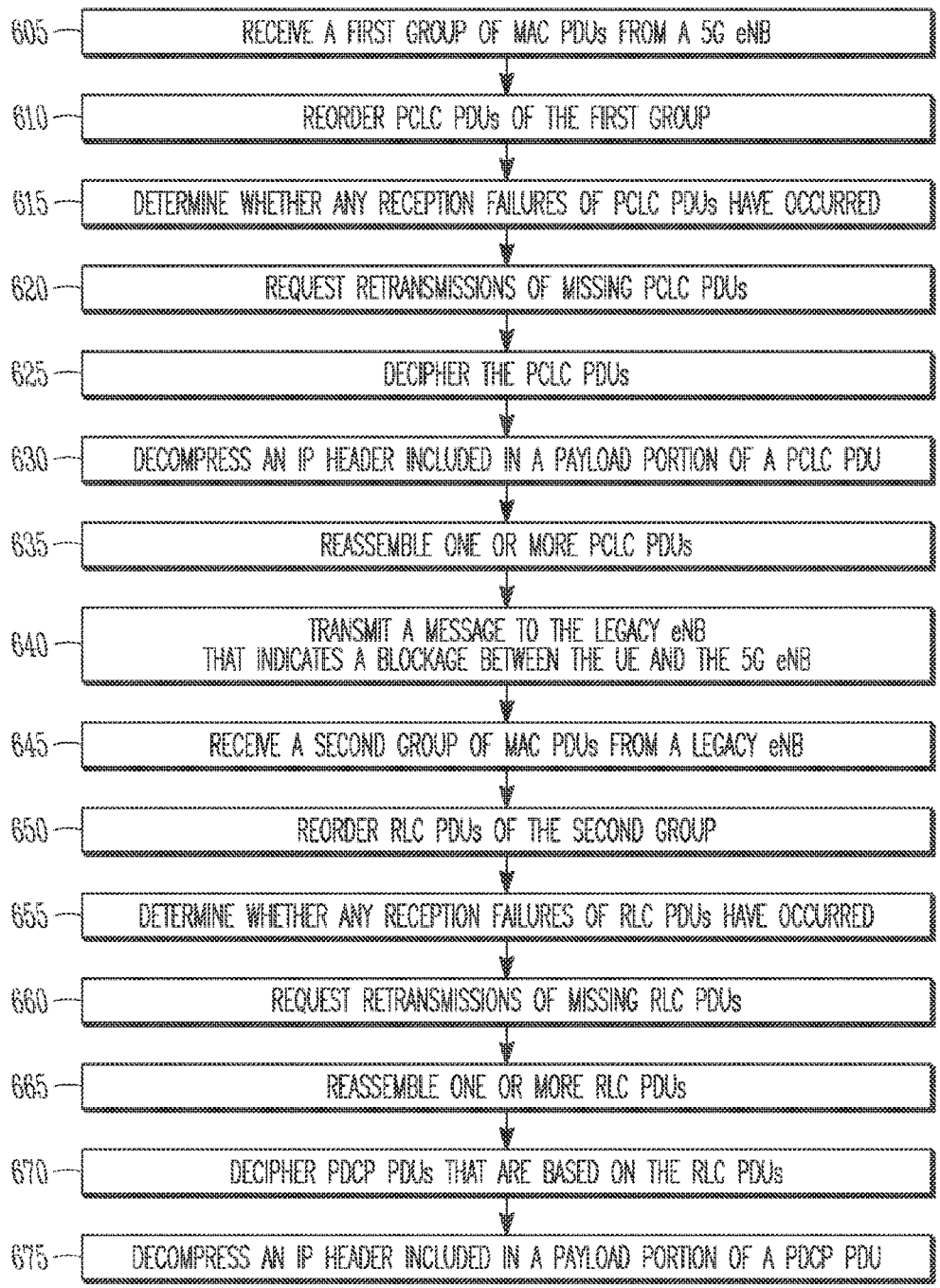
FIG. 6 illustrates the operation of a method of communication in accordance with some embodiments.

FIG. 6 illustrates the operation of a method of communication in accordance with some embodiments. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5 and 7-14, although it is understood that the method 600 may be practiced with any other suitable systems, interfaces and components.

In addition, while the method 600 and other methods described herein may refer to legacy eNBs 515, 3GPP LTE eNbs 515, 5G eNBs 525, eNBs 104 and/or UEs 102 operating in accordance with 3GPP standards, 5G standards and/or other standards, embodiments of those methods are not limited to just those devices. In some embodiments, the methods may be practiced by other devices, such as a Wi-Fi access point (AP) or user station (STA). In some embodiments, the UE 102 and/or other device may be arranged to operate in accordance with multiple protocols, such as a 3GPP protocol and a 5G protocol. In addition, the method 600 and other methods described herein may be practiced by wireless devices configured to operate in other suitable types of wireless communication systems, including systems configured to operate according to various IEEE standards such as IEEE 802.11. The method 600 may also refer to an apparatus for a UE 102, legacy eNB 515, 3GPP LTE eNB 515, 5G eNB 525 and/or eNB 104 and/or other device described above.

It should be noted that the method 600 and other methods described herein may be practiced by a wireless device that may be arranged to operate in accordance with one or more standards, such as 3GPP LTE standards, IEEE 802.11 WLAN standards, 5G standards and/or other standards, in some embodiments. Accordingly, although reference may be made to a UE 102 in the description of the method 600, it is understood that any suitable wireless device, such as a STA 102 and/or other device, may be used in some embodiments. In some embodiments, a UE 102 may be configured to communicate with a legacy network 510 (such as the 3GPP LTE network 510) and a 5G network 520. Accordingly, references may be made herein to the legacy network 510, 3GPP LTE network 510 and/or the 5G network 520 as part of descriptions of the methods 600, 1300, 1400 and/or other descriptions herein, but such references are not limiting, as other networks may be used in some embodiments.

It should also be noted that embodiments are not limited by references herein (such as in descriptions of the methods 600, 1300, 1400 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 605, the UE 102 may receive a first group of MAC PDUs from a 5G eNB 525. In some embodiments, the MAC PDUs may be received from the 5G eNB 525 while the UE 102 is served by the 5G eNB 525 and/or the 5G network 520. As an example, the UE 102 may be arranged to communicate with the 5G eNB 525 and a legacy eNB 515 in accordance with arrangements such as an inter-radio access technology (inter-RAT) arrangement in which the legacy eNB 515 may operate as a primary eNB and/or controlling entity. Accordingly, the legacy eNB 515 may perform operations such as establishment of communication between the UE 102 and the legacy eNB 515 and communication between the UE 102 and the 5G eNB 525, monitoring and/or control of the communication between the UE 102 and the 5G eNB 525, initiation and/or execution of handovers of the UE 102 between the 5G eNB 525 and legacy eNB 515 (in either direction), other control operations and/or other operations.

Figure 7:
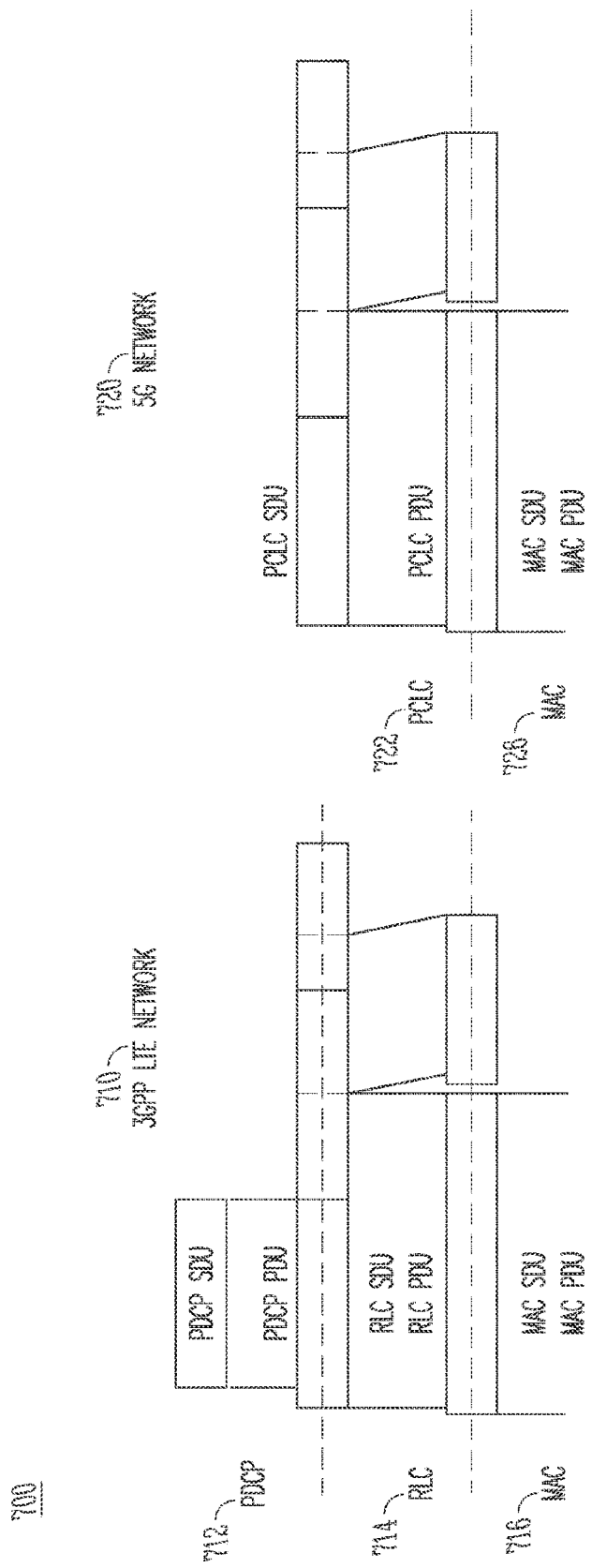
FIG. 7 illustrates examples of protocol layers in accordance with some embodiments.

FIG. 7 illustrates examples of protocol layers in accordance with some embodiments. An example architecture of protocol layers that may be used for a 3GPP LTE network (and/or legacy network) is shown as 710. An example architecture of protocol layers that may be used for a 5G network is shown as 720. It should be noted that embodiments are not limited by the examples 710, 720 in terms of arrangement, ordering, type, size, number and/or other aspects of the layers, parameters and/or other elements shown in FIG. 7. It should also be noted that one or more operations, methods and/or techniques described herein may be based on the architectures 710 and/or 720, although the scope of embodiments is not limited in this respect.

In some embodiments, a 3GPP LTE user plane may include PDCP, RLC, and MAC layers. In some cases, there may be overlapping of one or more functionalities between the PDCP layer and the RLC layer. As an example, both layers may allocate sequence numbers and may support status reporting. As another example, the RLC acknowledged mode (AM) and the RLC unacknowledged mode (UM) may support reordering and in-sequence delivery, while the PDCP may provide in-sequence delivery at re-establishment of lower-layers and duplicate discard. As another example, the PDCP layer may support timer based discard, and as a result, the RLC layer may also support the SDU discard. In general, when more layers are involved in protocol processing, more cost, complexity, and processing may be expected. Such processing issues may be more significant for very high data rates, such as those achievable by 5G systems. In addition, inter-layer interaction may be an issue. For example, an SDU discard function may require interaction between PDCP and RLC layers. In addition, when the protocol SDUs/PDUs are passed between layers, buffer management may be an issue. As another example, as part of a design of sequence number spaces for PDCP and RLC, caution must be taken that the SN space of each layer is sufficient for the other layer. Otherwise, a bottleneck in one layer may cause inefficiencies in the protocol and/or system.

In some systems, including but not limited to 5G systems, significantly increased peak data rates may be supported in comparison to other systems (such as 3GPP LTE and/or others), which may be challenging in some cases. In some embodiments, protocol processing at the transmitter and/or receiver may be simplified. For instance, buffering operations and/or processing operations may be reduced. In some embodiments, a lower overhead may be realized by usage of a reduced number of SNs (such as by combing SNs of two layers into a single SN). In some embodiments, ciphering operations may be more efficient and/or effective when performed on a concatenation of multiple small packets. In some embodiments, redundant functionalities between multiple layers may be combined to provide an increase in efficiency.

In some embodiments, a PCLC layer may provide one or more functionalities from a 3GPP LTE Package Data Converge Protocol (PDCP) layer and one or more functionalities from a 3GPP LTE Radio Link Control (RLC) layer. Accordingly, the PCLC layer may be a merged layer, in some cases. As an example, the PCLC layer may provide functionalities from a PDCP entity and/or an RLC acknowledgement mode (AM) entity. In some cases, redundant functionalities may be removed, including but not limited to sequence numbering and/or status reporting. Accordingly, an efficiency of operation may be realized in some cases. It should be noted that the PCLC layer is not limited to functionalities of the PDCP layer and RLC layers, as the PCLC layer may include one or more functionalities that are not necessarily included in the PDCP layer or RLC layer, in some embodiments.

The example architecture 710 will be described below. In some embodiments, the MAC layer 716, RLC layer 714, and the PDCP layer 712 may be implemented by the 3GPP LTE network. In the receive direction (upward in the diagrams of FIG. 7), a MAC PDU may be received, such as over the air, and may be processed into a MAC SDU by processing/operations of the MAC layer 716.

Continuing the description of the example architecture 710, the MAC SDU may be passed/input to the RLC layer 714 as an RLC PDU. In some embodiments, a particular RLC PDU may be the same as a particular MAC SDU (such as a direct passing between MAC 716 and RLC 714), although the scope of embodiments is not limited in this respect. In some cases, the particular RLC PDU may be based on the particular MAC SDU. The RLC PDU may be processed into an RLC SDU by processing/operations of the RLC layer 714. Such processing/operations of the RLC layer 714 may be based on RLC SNs, in some cases.

Continuing the description of the example architecture 710, the SDU may be passed/input to the PDCP layer 712 as a PDCP PDU. In some embodiments, a particular PDCP PDU may be the same as a particular RLC SDU (such as a direct passing between RLC 714 and PDCP 712), although the scope of embodiments is not limited in this respect. In some cases, the particular PDCP PDU may be based on the particular RLC SDU. The PDCP PDU may be processed into a PDCP SDU by processing/operations of the PDCP layer 712.

Such processing/operations of the PDCP layer 712 may be based on PDCP SNs, in some cases. As a non-limiting example, the PDCP SNs may be exclusive to the RLC SNs. As another non-limiting example, the PDCP SNs and the RLC SNs may be assigned separately from the PDCP layer 712 and RLC layer 714, respectively. As another non-limiting example, the PDCP SNs and the RLC SNs may be assigned independently by the PDCP layer 712 and RLC layer 714, respectively.

Continuing the description of the example architecture 710, the PDCP SDUs may be passed/input to upper layers, such as an application layer. For instance, the PDCP SINN may be passed to an upper layer as internet protocol (IP) packets, in some cases.

The example architecture 720 will be described below. In some embodiments, the MAC layer 726 and the layer 722 may be implemented by the 5G network. In the receive direction (upward in the diagrams of FIG. 7), a MAC PDU may be received, such as over the air, and may be processed into a MAC SDU by processing/operations of the MAC layer 726. The MAC SDU may be passed/input to the PCLC layer 722 as a PCLC PDU. In some embodiments, a particular PCLC PDU may be the same as a particular MAC SDU (such as a direct passing between MAC 726 and PCLC 722), although the scope of embodiments is not limited in this respect. In some cases, the particular PCLC PDU may be based on the particular MAC SDU. The PCLC PDU may be processed into a PCLC SDU by processing/operations of the PCLC, layer 722. In some embodiments, the processing/operations of the PCLC layer 722 may be based on PCLC SNs. As a non-limiting example, a PCLC PDU/SDU may be assigned a PCLC SN by the PCLC layer 722. The PCLC SDUs may be passed/input to upper layers, such as an application layer. For instance, the PCLC SDUs may be passed to an upper layer as internet protocol (IP) packets, in some cases.

In some embodiments, the PCLC layer 722 may perform one or more operations that may be similar to operations performed by the PDCP layer 712 and may perform one or more operations that may be similar to operations performed by the RLC layer 714. Accordingly, the PCLC layer 722 may be considered a combined layer, merged layer and/or joint layer in comparison to the two layers, PDCP 712 and RLC 714, used in the example architecture 710 of the 3GPP LTE network. In addition, the PCLC layer 722 may use a single PCLC SN for a PCLC SDU/PDU in contrast to the usage of the two SNs (the PDCP SN of the PDCP layer 712 and the RLC SN of the RLC layer 714) in the example architecture 710 of the 3GPP LTE network 710.

Returning to the method 600, in some embodiments, the MAC PDUs of the first group (received at operation 605) may be formatted, by the 5G eNB 525, in accordance with a 5G format such as in the example architecture 720 shown in FIG. 7 or other. At operation 610, the UE 102 may reorder PCLC PDUs of the first group of MAC PDUs that include PCLC PDUs. The reordering may be based on PCLC SNs, in some embodiments.

At operation 615, the UE 102 may determine whether any reception failures of PCLC PDUs have occurred. The UE 102 may request retransmission of missing PCLC PDUs at operation 620, such as by transmission of one or more messages to the 5G eNB 525. It should be noted that operation 620 may be performed when it is determined, such as at operation 615, that at least one PCLC PM is missing and/or that a reception failure for at least one PCLC PDU has occurred.

It should also be noted that operations 615 and 620 may be performed when the UE 102 operates in accordance with an acknowledged mode (AM) of operation. The UE 102 may refrain from performing operations 615 and 620 when operating in accordance with an unacknowledged mode (UM) of operation, in some cases. However, the reordering operation 610 may still be performed as part of the UM operation, in some embodiments.

At operation 625, the UE 102 may decipher PCLC PDUs. In some embodiments, the PCLC PDUs may be deciphered in accordance with decipher keys that are based at least partly on the PCLC SNs. In addition, the decipher keys may be further based at least partly on a hyper-frame number (HFN) of the 5G eNB 525 for the first group of MAC PDUs, in some embodiments. The decipher operation may be performed on the reordered PCLC PDUs, in some embodiments, although the scope of embodiments is not limited in this respect. In addition, one or more PCLC SDUs may be based on the deciphered, reordered PCLC PDUs, in some embodiments.

At operation 630, the UE 102 may decompress one or more internet protocol (IP) headers. In some embodiments, the deciphered, reordered PCLC PDUs may include PCLC header portions and PCLC payload portions. In some cases, the PCLC payload portions of one or more of the deciphered, reordered PCLC PDUs may include compressed internet protocol (IP) headers. The IP headers may have been compressed by the 5G eNB 525. The UE 102 may decompress the compressed IP headers. In some embodiments, the decompression may be performed based at least partly on the PCLC SNs of the one or more deciphered, reordered PCLC PDUs that include compressed IP headers in the PCLC payload portion. The decompressed headers may be included in PCLC SDUs that are input to the upper layers, in some embodiments.

At operation 635, the UE 102 may reassemble one or more PCLC PDUs determined to have been concatenated or segmented. The UE 102 may determine this based on indicator(s) included in the PCLC PDUs. It should be noted that in some embodiments, the reassemble operation may include splitting, by the UE 102, of a received PCLC PDU that was concatenated at the eNB 104, in some cases. Accordingly, the reassemble operation may be considered an opposite operation or reciprocal operation to the concatenation operation, in some cases. It should be noted that in some embodiments, the reassemble operation may include reassembly, by the UE 102, of one or more received PCLC PDUs that were segmented at the eNB 104, in some cases. Accordingly, the reassemble operation may be considered an opposite operation or reciprocal operation to a segmentation operation, in some cases. In some cases, a PCLC PDU may be formed, at the 5G eNB 525 based on a concatenation of a first group of outbound PCLC SDUs and further based on one or more segments of each of a second group of one or more PCLC SDUs. That is, a combination of concatenation and segmentation may be used in the formation of one or more of the PCLC PDUs. The reassembly at the UE 102 may be performed in accordance with the combined concatenation/segmentation in such cases. It should also be noted that similar techniques of combining concatenation/segmentation operations in the formation of one or more RLC PDUs may also be used by the legacy eNB 515, in some cases. Accordingly, a reassembly at the UE 102 of legacy RLC PDUs (such as at operation 665) may be performed in accordance with the combined concatenation/segmentation, in such cases.

It should be noted that, as previously described, embodiments are not limited to the chronological ordering of operations shown in FIG. 6. As an example, operations of concatenation/segmentation on the transmit side (5G eNB 525 in this case) may be performed before or after operations such as ciphering. For instance, multiple PCLC SDUs may be concatenated before ciphering, in which case the deciphering may be performed (by the UE 102 on the receive side) before the reassembly. Embodiments are not limited by this example, however, as operations may be performed in a different order, in some embodiments.

Figure 8:
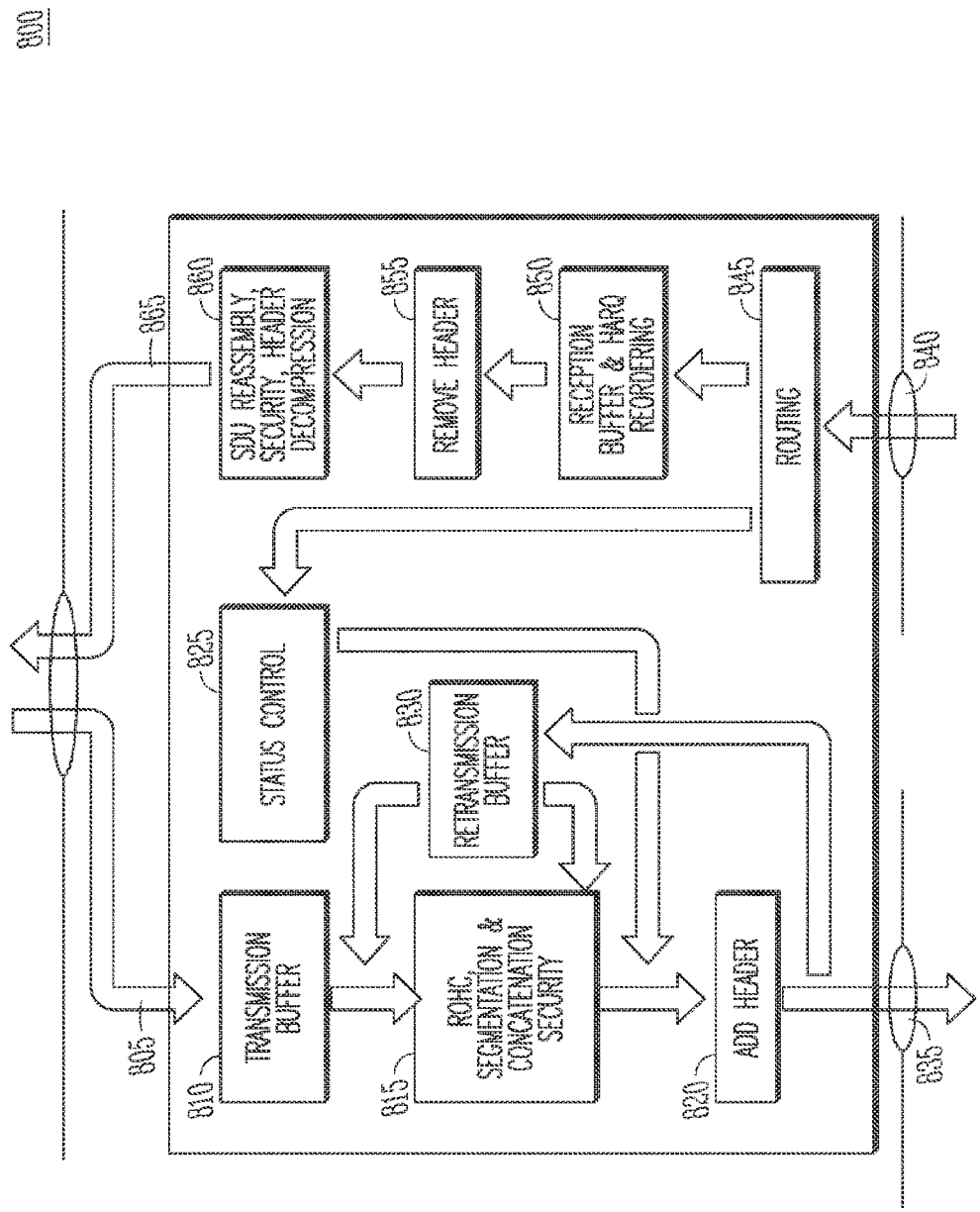
FIG. 8 illustrates example operations in accordance with some embodiments.

FIG. 8 illustrates example operations in accordance with some embodiments. The operations may be performed as part of a PCLC layer, in some embodiments. It should be noted that embodiments are not limited by the example 800 in terms of arrangement, ordering, type, size, number and/or other aspects of the layers, operations, parameters and/or other elements shown in FIG. 8. The operations 810-830 may be PCLC transmission operations, while the operations 845-860 may be receive operations.

In some embodiments, one or more of the following transmission operations may be performed by a PCLC layer of a transmitting entity. The transmitting entity may be the UE 102 in some cases, such as in uplink operation. The transmitting entity may be the 5G eNB 525 or other base station in other cases, such as in downlink operation. As an example operation of the transmitting entity, association of a PCLC SN corresponding to a PCLC PDU may be performed. As another example operation of the transmitting entity, header compression for a Data Radio Bearer (DRB) may be performed, if configured. As other example operations of the transmitting entity, segmentation and/or concatenation of PCLC SDUs may be performed. The PCLC SDUs may be internet protocol (IP) packets, in some cases, although the scope of embodiments is not limited in this respect. The segmentation and/or concatenation may be similar to operations performed by the RLC layer of 3GPP LTE operation, in some cases. Accordingly, the segmentation and/or concatenation may be based on available resources, which might be indicated from MAC or PHY layers, in some cases.

As another example operation of the transmitting entity, integrity protection for a Signaling Radio Bearer (SRB) may be performed. As another example operation of the transmitting entity, ciphering may be performed. In some embodiments, the ciphering may be performed using a count parameter that may be based on a Hyper Frame Number (HFN) and/or PCLC SN. It should be noted that the HFN may be used in a similar manner to usage of the HFN as part of PDCP layer operation of 3GPP LTE operation. For instance, when the PCLC SN wraps around (exceeds the maximum value possible in a modular arrangement), the HFN may increase by one and the PCLC SN may wrap around back to the value of 0. In some cases, the ciphering may be performed jointly for some or all payloads of a PDU (assuming SRB and DRB are handled by different PCLC entities).

As another example operation of the transmitting entity, a header may be added. As another example operation of the transmitting entity, a windowing operation and/or retransmission operation may be performed. Such operations may be performed in a similar manner as operations of the RLC layer of 3GPP LTE operation, in some embodiments, although the scope of embodiments is not limited in this respect. As an example, a maximum window size may be half of an SN space, and the transmitting entity may not allow more than half of the SN space to be in flight (such as in transit between the transmitting entity and a receiving entity) at a particular time. The retransmission may be based on feedback from the receiving entity, in some embodiments.

It should be noted that embodiments are not limited by these example operations of the PCLC layer of the transmitting entity. In some embodiments, additional operations, similar operations and/or alternate operations may be performed by the PCLC layer of the transmitting entity. In some embodiments, the PCLC layer of the transmitting entity may not necessarily perform all of the operations described above.

In some embodiments, a PCLC layer of a receiving entity may perform one or more of the following operations and/or other operations. The receiving entity may be the UE 102 in some cases, such as in downlink operation. The receiving entity may be the 5G eNB 525 or other base station in other cases, such as in uplink operation. As an example operation of the receiving entity, reordering may be performed. The reordering may be performed in a similar manner as operations of the RLC layer of 3GPP LTE operation, in some embodiments, although the scope of embodiments is not limited in this respect. As another example operation of the receiving entity, deciphering and/or integrity check operations may be performed.

As another example operation of the receiving entity, header decompression may be performed, if configured. As another example operation of the receiving entity, receiver feedback may be performed. It should also be noted that the receiver feedback operation may be performed in a similar manner as operations of the RLC layer of 3GPP LTE operation, in some embodiments, although the scope of embodiments is not limited in this respect.

It should be noted that embodiments are not limited by these example operations of the PCLC layer of the receiving entity. In some embodiments, additional operations, similar operations and/or alternate operations may be performed by the layer of the receiving entity. In some embodiments, the PCLC layer of the receiving entity may not necessarily perform all of the operations described above.

Figure 9:
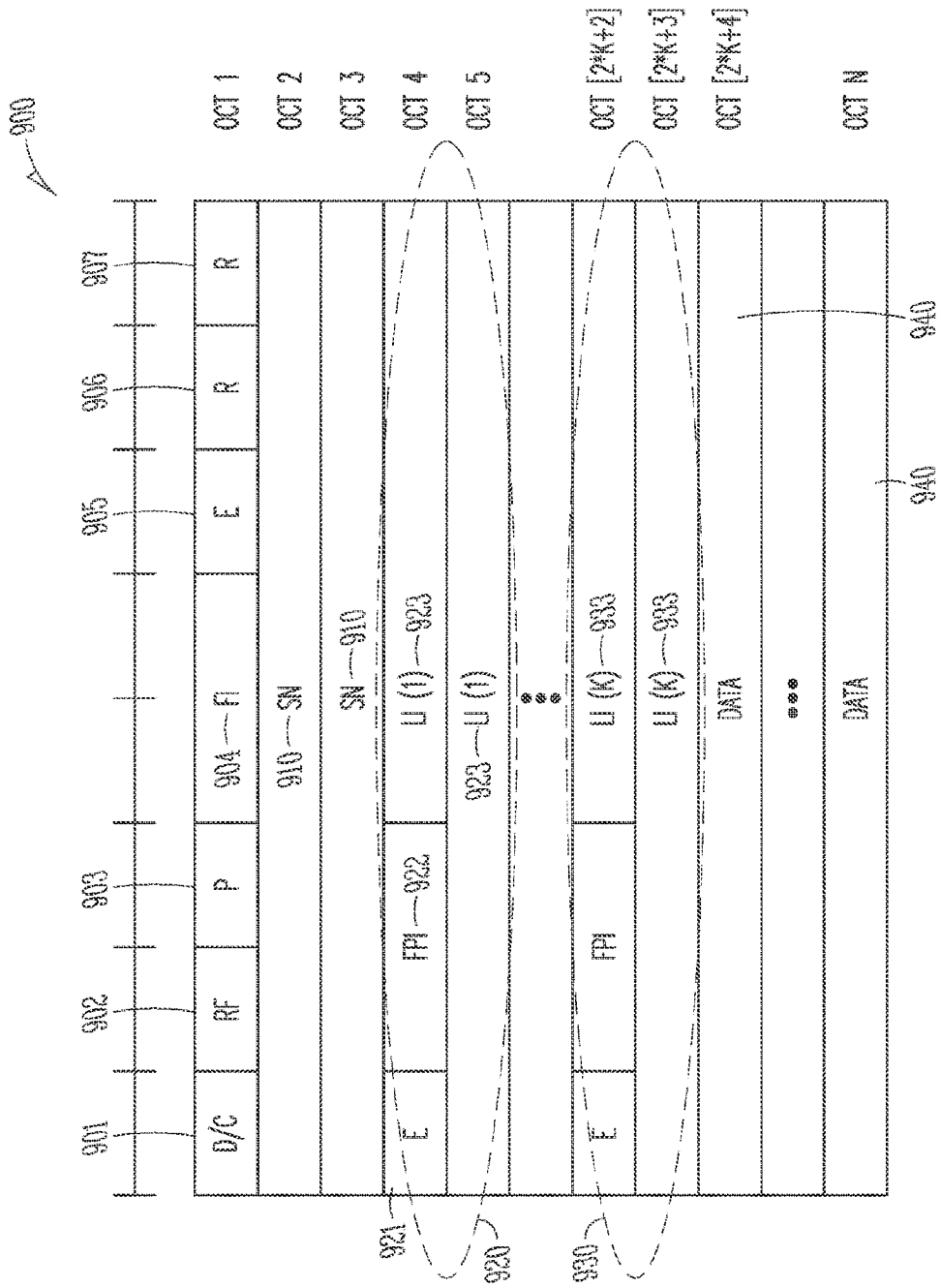
FIG. 9 illustrates an example packet convergence and link control (PCLC) protocol data unit (PDU) in accordance with some embodiments.

FIG. 9 illustrates an example packet convergence and link control (PCLC) protocol data unit (PDU) in accordance with some embodiments. It should be noted that embodiments are not limited by the example PDU 900 in terms of arrangement, ordering, type, size, name, number and/or other aspects of the parameters shown in FIG. 9. For instance, all parameters and/or information shown in FIG. 9 may not necessarily be included in some embodiments. In some embodiments, a PCLC PDU may include one or more parameters that may be similar to and/or related to those shown in the example PDU 900. In some embodiments, a PCLC PDU may include additional parameters not shown in FIG. 9. In addition, the organization of the parameters and/or information shown in the example PDU 900 is not limiting.

In some embodiments, the format of the PCLC PDU 900 may be based at least partly on an LTE RLC AMD PDU format that may be included in a 3GPP LTE standard and/or other standard, although the scope of embodiments is not limited in this respect.

The D/C field 901 may indicate whether the PCLC PDU 900 is a control PDU or a data PDU. For example, a control PDU may be indicated by a value of 0 and a data PDU may be indicated by a value of 1. The RF field 902 may indicate whether the PCLC PDU 900 is a PDU or a PDU segment. It should be noted that a format of a PCLC PDU segment may be at least partly based on a format of an LTE RLC AMD PDU Segment, although the scope of embodiments is not limited in this respect. The P field 903 may indicate whether or not the transmitting side of a PCLC entity requests a STATUS report from its peer PCLC entity. The Framing Info (FI) field 904 may indicate whether a PCLC SDU is segmented at the beginning and/or at the end of the Data field 940. For instance, the FI field 904 may indicate whether a first byte of the Data field 940 corresponds to a first byte of a PCLC SDU and/or whether a last byte of the Data field 940 corresponds to a last byte of the PCLC SDU.

The E field 905 may indicate whether the Data field 940 follows or one or more a set of E field (such as 921) and LI field (such as 923) follows. The FPI field 922 may be per packet marking, which may be used for QoS purposes. The R field 906 may include one or more reserved bits. The sequence number (SN) 910 may be an SN of the PCLC layer. Any suitable number of bits, bytes, octets and/or other unit may be used. The LI field 923 may indicate a length (such as in bytes or other unit) of a corresponding Data field element 940 present in the PCLC data PDU 900 delivered/received by the PCLC entity. A first LI field 923 present in the PCLC data PM header (for instance, the header may include 901-930) may correspond to a first Data field element present in the Data field 940 of the PCLC data PDU 900. In addition, if a second LI (such as 933) is present in the PCLC data PDU header, the second LI 933 may correspond to a second Data field element present in the Data field 940 of the PCLC data PDU. The usage of groups of fields like 920, 930 may be extended to any suitable number of Data field elements present in the Data field 940. A value of 0 for the LI fields 923, 933 may be reserved.

It should be noted that the format of the PCLC PDU 900 is an example format that may demonstrate some or all concepts, operations and/or techniques described herein, but embodiments are not limited to the example format shown. In some embodiments, a field length, such as a length of the SN 910, LI 923 and/or other fields, may be different from the lengths shown in FIG. 9 and/or may change based on various factors/reasons, including but not limited to data rate, packet size, service types and/or other. In some embodiments, some fields shown in FIG. 9 may not necessarily be present. This may depend on whether certain features are supported or not, in some cases. For example, the RF field 902 may not necessarily be present if re-segmentation is not supported. In some embodiments, for a signaling radio bearer (SRB), a MAC-I field (for integrity protection) may be included in the PDU 900 (such as at the end of the PDU 900 or elsewhere). For instance, the MAC-I may include 32 bits in some cases, although embodiments are not limited to this example number, and any suitable number of bits may be used.

In some embodiments, one SN may be used for each PCLC PDU and ciphering may be performed after segmentation/concatenation of PCLC SDUs. In some embodiments, one SN may be used for each PCLC SDU, and ciphering may be performed on the PCLC SDU directly. As an example, segmentation/concatenation may be performed on ciphered PCLC SDUs, and an additional SN may be used for each PCLC PDU. As another example, the PCLC layer may refrain from segmentation/concatenation in the PCLC layer, in which case there may be a one to one relationship between a PCLC SDU and a PCLC PDU. In this example, concatenation/segmentation may be performed in the MAC layer. Accordingly, the FI field in this example may be included in a MAC header.

Returning to the method 600, one or more of operations 640-675 may be performed by the UE 102 in some embodiments. It should be noted that some embodiments of the method 600 may not necessarily include all operations shown in FIG. 6. In addition, operations 605-635 may be based on communication with a 5G eNB 104 while operations 640-675 may be based on communication with a legacy eNB 104, in some cases. As an example, a UE 102 configured to operate as a 5G UE 102 may perform one or more of operations 605-635 and may not necessarily perform any of operations 640-675. For instance, the 5G eNB 104 and 5G UE 102 may operate as part of a stand-alone 5G network in this example. As another example, a UE 102 may be configured to communicate with a eNB 104 of a legacy network and with a 5G eNB 104 of a 5G network. The UE 102 in this case may perform one or more of operations 605-675. For instance, the legacy network and the 5G network may operate cooperatively to enable multi-network communication by the UE 102 in this example. The legacy network and legacy eNB 104 may be configured to operate in accordance with 3GPP LTE standards in some embodiments, although the scope of embodiments is not limited in this respect.

At operation 640, the UE 102 may transmit a message to the legacy eNB 515 that indicates information such as a blockage between the UE 102 and the 5G eNB 525, an unavailability of the 5G eNB 525, a performance measurement (such as a throughput, error rate, signal quality measurement and/or other) of the link between the UE 102 and the 5G eNB 525 and/or other. In some cases, the message may indicate that the UE requests a handover back to the legacy eNB 515. In some cases, the legacy eNB 515 may determine that the handover back to the legacy eNB 515 is to be performed based at least partly on the message from the UE 102.

It should be noted that various handovers may occur. The handovers may be initiated, managed and/or controlled by the legacy eNB 515 and/or legacy network 510, in some cases, although embodiments are not limited as such. As an example, a handover from the legacy eNB 515 (and/or legacy network 510) to the 5G eNB 525 (and/or the 5G network 520) may be performed. Such a handover may be performed at any suitable time. For instance, the handover between the legacy eNB 515 to the 5G eNB 525 may be performed after the legacy eNB 515 establishes communication with the UE 102. As another example, a handover from the 5G eNB 525 (and/or the 5G network 520) to the legacy eNB 515 (and/or legacy network 510) may be performed. Such a handover may be performed at any suitable time. As another example, a fall back from the 5G eNB 525 (and/or the 5G network 520) to the legacy eNB 515 (and/or legacy network 510) may be performed, such as described regarding operation 640.

Accordingly, the UE 102 may receive a first group of MAC PDUs from the 5G eNB 525 at operation 605 and may perform one or more operations, such as 610-640 and/or others, while in communication with the 5G eNB 525. The UE 102 may receive a second group of MAC PDUs from the legacy eNB 515 at operation 645 and may perform one or more operations, such as 650-675 and/or others, while in communication with the legacy eNB 515. It is understood that embodiments are not limited by the chronological ordering of operations shown in FIG. 6. The order in which the operations of FIG. 6 are performed may depend on various handover scenarios, in some embodiments.

As an example, the second group of MAC PDUs may be received from the legacy eNB 515 after a handover of the UE 102 from the 5G eNB 525 to the legacy eNB 515. As another example, the first group of MAC PDUs may be received after a handover of the UE 102 from the legacy network 510 to the 5G network 520, and the second group of MAC PDUs may be received after a fall back of the UE 102 to the legacy eNB 510. As another example, the first group of MAC PDUs may be received after a handover of the UE 102 from the legacy eNB 515 to the 5G eNB 525.

Returning to the method 600, at operation 650, the UE 102 may reorder radio link control (RLC) PDUs based on RLC SNs. In some embodiments, the second group of MAC PDUs may include packet data convergence protocol (PDCP) PDUs encapsulated in RLC PDUs. At operation 655, the UE 102 may determine whether any reception failures of RLC PDUs have occurred. The UE 102 may request retransmissions of missing RLC PDUs at operation 660. At operation 665, the UE 102 may reassemble one or more RLC PDUs. In some embodiments, the reassemble operation may include splitting of a received RLC PDU that was concatenated at the eNB 104, in some cases. In some embodiments, the reassemble operation may include reassembly of one or more received RLC PDUs that were segmented at the eNB 104, in some cases. In some cases, the RLC SNs may be used for operations 655-665.

At operation 670, the UE 102 may decipher PDCP PDUs that are based on the RLC PDUs. In some embodiments, the UE 102 may decipher the PDCP PDUs in accordance with decipher keys that are based at least partly on PDCP SNs that are exclusive to the RLC SNs. At operation 675, the UE 102 may decompress an IP header included in a payload portion of a PDCP PDU. The decompression may be performed based on the PDCP SNs, in some embodiments.

In some embodiments, for the first group of MAC PDUs, the UE 102 may forward the PCLC SDUs to an application layer of the UE 102 as internet protocol (IP) packets. For the second group of MAC PDUs, the UE 102 may forward the PDCP SDUs to the application layer of the UE 102 as IP packets. It should be noted that embodiments are not limited to IP packets or to the application layer, as the UE 102 may forward the PCLC SDUs and/or PDCP SDUs to the application layer and/or other layer in any suitable format (such as any type of PDU).

In some embodiments, a handover between 5G eNBs 525 may be performed. During the handover, the PCLC layer may not reset a PCLC SN (which may be similar to PDCP operation in 3GPP LTE protocols/standards in some cases). A reordering operation may continue as in the case when handover is not performed, in some cases. For data forwarding between eNBs, for PCLC PDUs that are not successfully delivered to the UE 102, a source eNB 525 should provide the PCLC PDUs to the target eNB 525, However PCLC PDUs may not be ciphered in this case. In some embodiments, the target eNB 525 may use a same set of consecutive SNs for retransmission. Otherwise, there may be one or more missing SNs or one or more SNs may be reused, which may cause duplication discard, packet loss and/or other effects. It should be noted that in this case, integrity protection may be realized and/or guaranteed between the source eNB 525 and the target eNB 525. For instance, an X2 interface and/or other interface may be used. In some embodiments, to avoid potential different understanding of the PCLC status, the target eNB 525 may retransmit the PCLC PDUs (applied with new security keys) to the UE 102. In some cases, a same concatenation/segmentation may be used. The UE 102 may send a PCLC status report to the target eNB 525 to optimize retransmission, in some cases. This may be optionally configured by the network, in some cases.

In some embodiments, handover from the LTE network 510 to the 5G network 520 (such as from the LTE eNb 515 to the 5G eNB 525) may be performed. For instance, a design goal may be to support lossless transmission when one radio bearer is switched between two different protocol architectures. In some embodiments, a user plane architecture option 1A (SCG) bearer may be used, in which independent protocol stacks are used for the LTE network 510 and the 5G network 520. These embodiments are not limiting, however.

Figure 10:
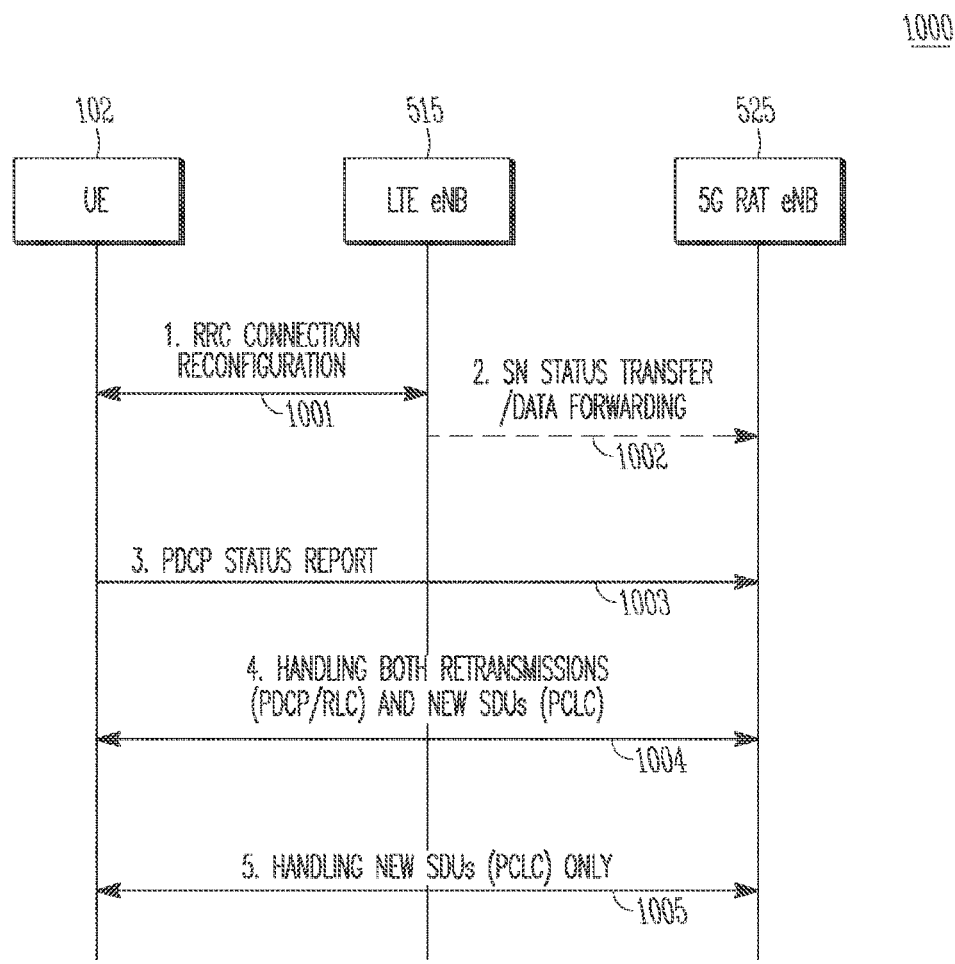
FIG. 10 illustrates examples of messages that may be exchanged in accordance with some embodiments.
Figure 11:
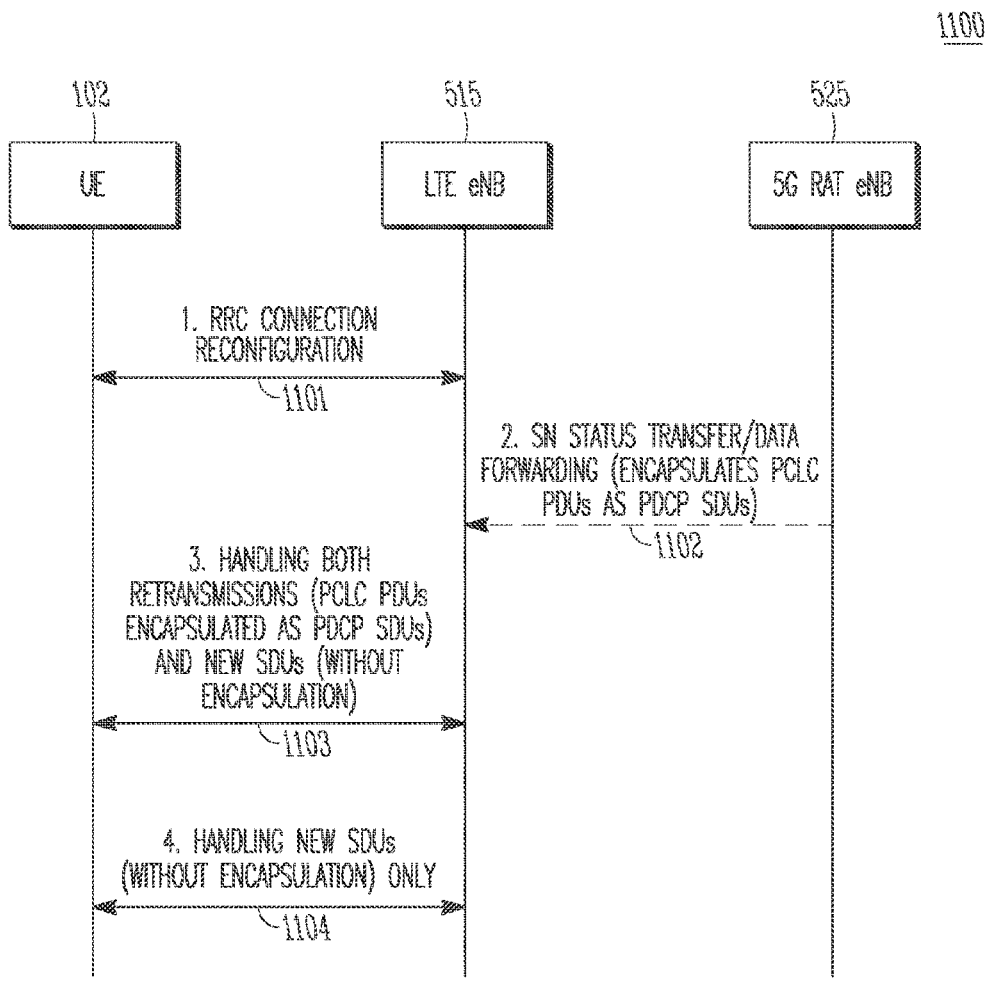
FIG. 11 illustrates additional examples of messages that may be exchanged in accordance with some embodiments.
Figure 12:
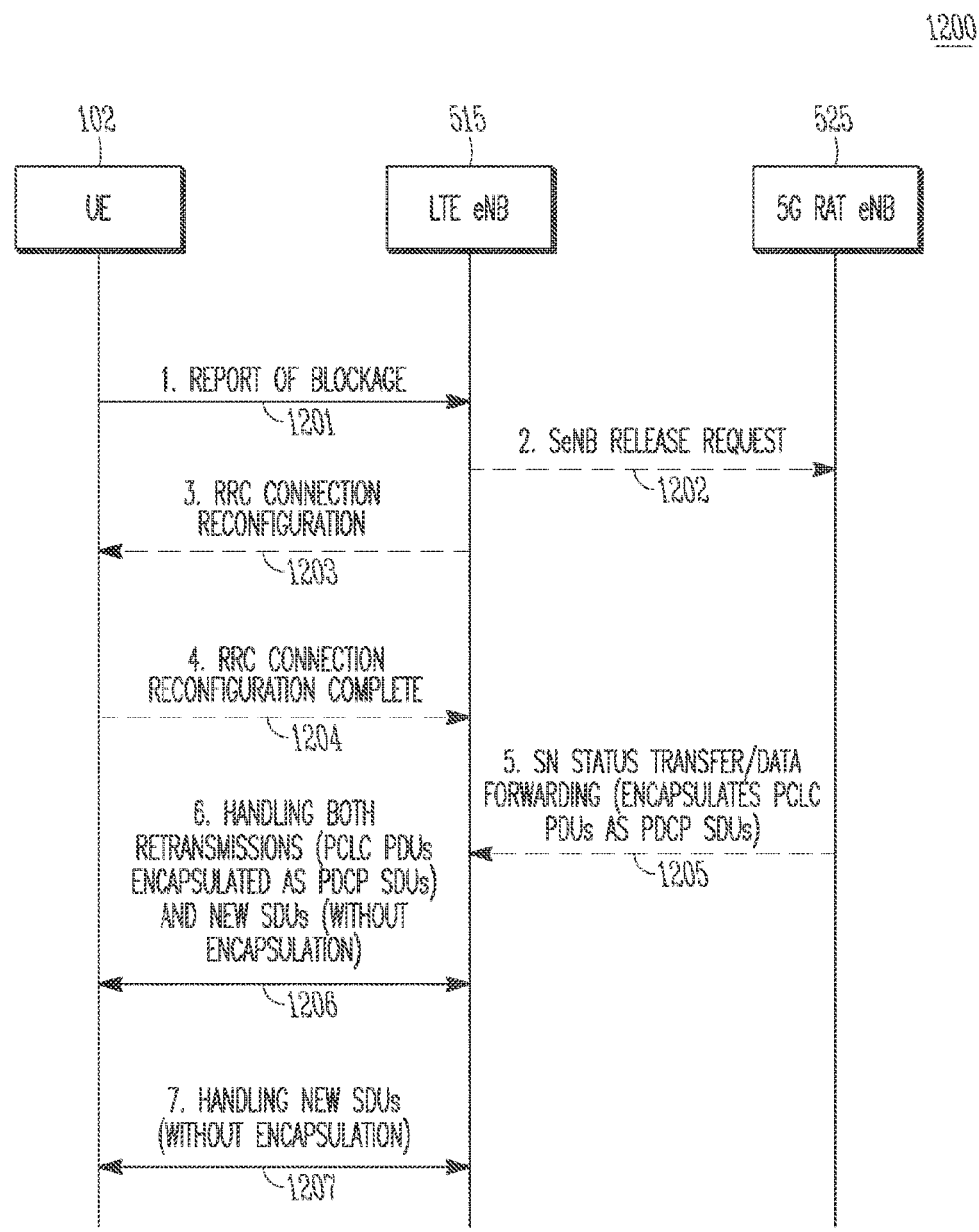
FIG. 12 illustrates additional examples of messages that may be exchanged in accordance with some embodiments.

FIGS. 10-12 illustrate examples of messages that may be exchanged in accordance with some embodiments. It should be noted that embodiments are not limited by the name, type, ordering or arrangement of messages shown in FIGS. 10-12 as other suitable messages may be used. In addition, embodiments are not limited to the chronological order shown in the examples of FIGS. 10-12. Some embodiments may not necessarily include all operations shown. Some embodiments may include additional operations not shown. Some embodiments may include alternate operations or operations that are similar to those shown in any of FIGS. 10-12.

Referring to FIG. 10, an example of a handover from the LTE network 510 to the 5G network 520 is shown. In some cases, the method 1000 may be viewed as an SCG Addition in which the 5G network 520 and/or 5G eNB 525 are added. In some cases, network side behavior about SN status/data forwarding may be unchanged. It should be noted that the following discussion of the method 1000 is focused on downlink operation, but it is understood that similar handling may be performed for uplink operation, in some cases.

At operation 1001, the network may initiate an RRC Connection Reconfiguration procedure for SCG Addition. The UE 102 may maintain a PDCP entity and may also establish a PCLC entity. At operation 1002, SN status/data forwarding between eNBs 515, 525 may be performed. At operation 1003, the UE 102 may send a PDCP status report to the 5G eNB 525. The 5G eNB 525 may process it accordingly. At operation 1004, communication between the UE 102 and the 5G eNB 525 may be performed Any suitable technique may be used by the UE 102 to differentiate whether a MAC PDU should be handled in the LTE PDCP and/or RLC layers, or in the PCLC layer of the 5G network. It should be noted that the 5G eNB 525 may know which SDUs are new SDUs based on the PDCP status report, in some cases, Multiple options are possible. In some embodiments, a bit in the MAC layer may indicate which layer is to process the packet. As an example, one bit may be encoded as part of a MAC header to serve this purpose. PDCP retransmissions may be processed by the LTE PDCP layer and/or LTE RLC layer, SDUs of the 5G network (exchanged between the UE 102 and the 5G eNB 525) may be processed by the PCLC layer. In some embodiments, PDCP retransmissions may be encapsulated as PCLC SDUs. The 5G eNB 525 may indicate when such encapsulate is stopped, in some cases. At operation 1005, after all out-of-order PDCP packets (from the LTE network 510) are successfully received or discarded based on a reordering timer, the PDCP/RLC entity may be released. The UE 102 may then process PCLC packets after the handover to the 5G network 520.

Referring to FIG. 11, an example of a handover from the 5G network 520 to the LTE network 510 is shown. In some cases, the method 1100 may be viewed as an SCG Addition in which the UE 102 may stop using resources of the 5G network 520 and/or 5G eNB 525. It should be noted that the following discussion of the method 1100 is focused on downlink operation, but it is understood that similar handling may be performed for uplink operation, in some cases.

At operation 1101, the network may initiate an RRC Connection Reconfiguration procedure for SCG Removal. The UE 102 may still maintain the PCLC entity, and also may establish PDCP and/or RLC entities. The LTE eNb 515 or the 5G eNB 525 may indicate to the UE 102 the set of PDCP SNs for retransmission. At operation 1102, SN status/data forwarding between eNBs 515, 525 may be performed. The 5G eNB 525 may encapsulate PCLC PDUs as PDCP SDUs and may forward them to the LTE eNb 515. Segmentation may be performed to conform to a PDCP SDU size (such as 8188 bytes or other suitable value. The PDCP SN may be assigned starting from 0 consecutively, in some cases. Ciphering may be performed by the LTE network 510 or by the 5G network 520.

At operation 1103, communication between the UE 102 and the LTE eNb 515 may be performed. After RLC/PDCP operation, the UE 102 may perform PCLC layer operation for PDCP SNs indicated in operation 1101. The UE 102 may do reassembly based on the PCLC header, in some cases. At operation 1104, after all out-of-order PCLC packets are successfully received or discarded based on the reordering timer, the PCLC entity may be released.

In the method 1100, the PCLC PDUs may be encapsulated as PDCP SDUs, in some embodiments. As an example alternative, the UE 102 may send a PCLC status report to the 5G eNB 525, then the 5G eNB 525 may assume that the UE 102 will discard the received PCLC SDUs starting from the first missing PCLC SDU. The 5G eNB 525 may start to forward PCLC SDUs as PDCP SDUs to the LTE eNb 515, starting from the first PCLC SDUs not successfully received by the UE 102. Accordingly, the UE 102 may only receive PDCP SDU/PDU from LTE eNb 515 in such cases.

Referring to FIG. 12, an example of a fallback from the 5G network 520 to the LTE network 510 is shown. In some cases, the method 1200 may be similar to bearer switching in option 1A (SCG bearer). In some embodiments, handling of data forwarding and retransmission may be similar to that of method 1100 in which handover from the 5G network 520 to the LTE network 510 is performed, although the scope of embodiments is not limited in this respect. It should be noted that the following discussion of the method 1200 is focused on downlink operation, but it is understood that similar handling may be performed for uplink operation, in some cases.

At operation 1201, the UE 102 may report to the network about a blockage problem. In some cases, the blockage problem may (at least partly) cause the fallback procedure to be initiated, although the scope of embodiments is not limited in this respect. In some cases, one or more other events and/or conditions may (at least partly) cause the fallback procedure to be initiated. At operation 1202, the LTE eNb 515 may send a Secondary eNB (SeNB) Release Request message to ask the 5G eNB 525 to release the SCG part. At operation 1203, the network may initiate an RRC Connection Reconfiguration procedure for SCG Removal. The UE 102 may still maintain the PCLC entity, in some cases, and may also establish a PDCP/RLC entity.

At operation 1204, the UE 102 may send a message, such as an RRC Connection Reconfiguration Complete message that may confirm the procedure of operation 1203. At operation 1205, SN status transfer and data forwarding between eNBs 515, 525 may be performed. The 5G eNB 525 and/or 5G network 520 may encapsulate PCLC PDUs as PDCP SDUs and may forward them to the LTE eNb 515. The LTE eNb 515 may indicate to the UE 102 the set of PDCP SNs for retransmission. At operation 1206, communication between the UE 102 and the LTE eNb 515 may be performed. After RLC/PDCP operation, the UE 102 may perform layer operation for PDCP SNs indicated by the LTE eNb 515. The UE 102 may do re-assembly based on the PCLC header, in some cases. After all out-of-order PCLC packets are successfully received or discarded based on the reordering timer, the PCLC entity may be released.

In some embodiments, re-segmentation may be performed in LTE when the resources available for RLC retransmission is less than that of an initial transmission. For instance, segment sizes and/or other parameters may need to be readjusted in some cases due to a difference between resources available when the initial transmission was performed and resources available when the re-transmission is to be performed. For the merged layer (PCLC), security may be performed per PCLC PDU (associated with each PCLC PDU SN), in some cases. The same COUNT may not be used for different PDU segments, in some cases, which may be due to a security rule and/or other factors. In some embodiments, an additional field may be included in the PCLC header and may be used as an additional input to a ciphering algorithm. The additional field may be different for the original PDU and for retransmission segments, in some cases.

Figure 13:
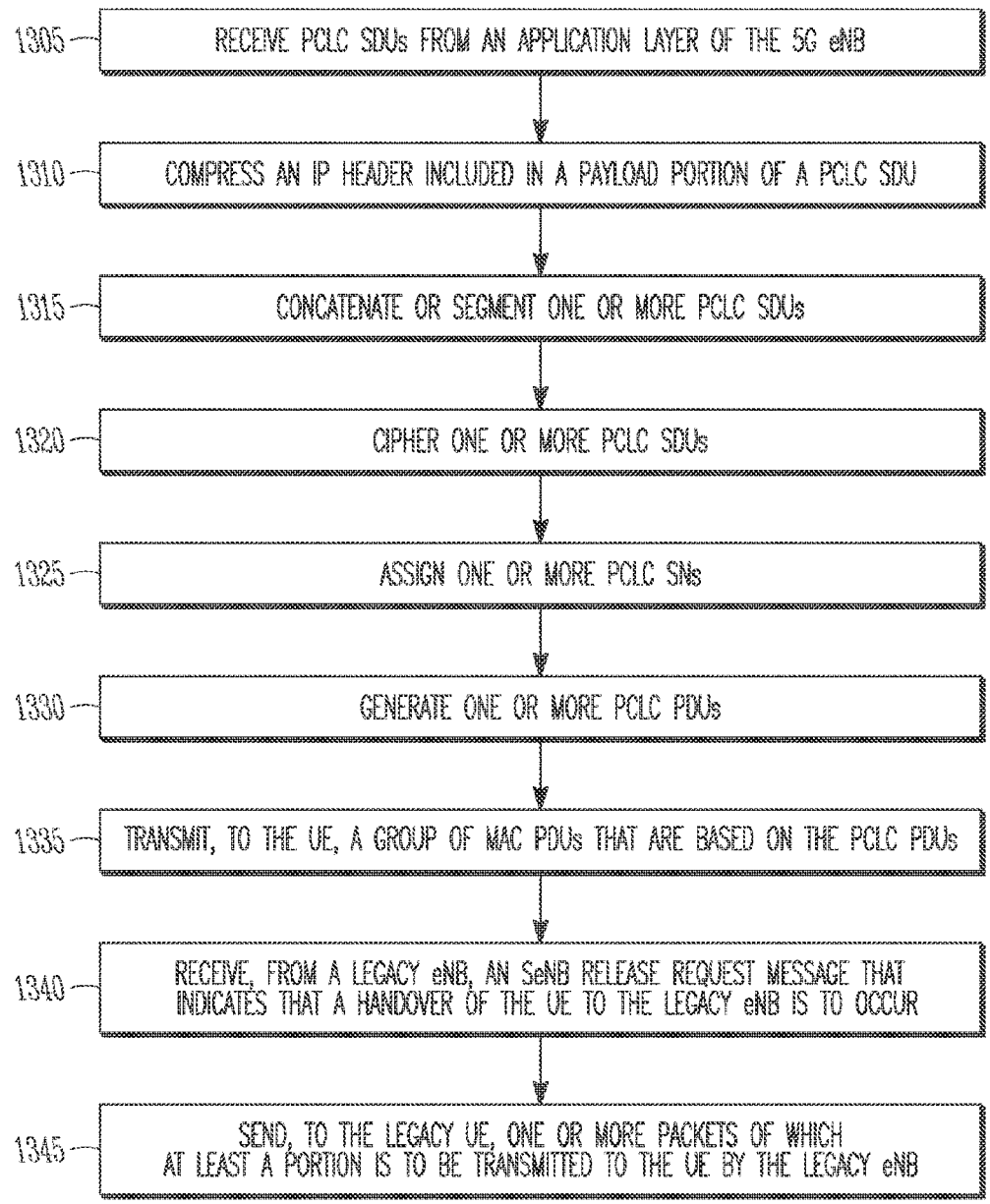
FIG. 13 illustrates the operation of another method of communication in accordance with some embodiments.
Figure 14:
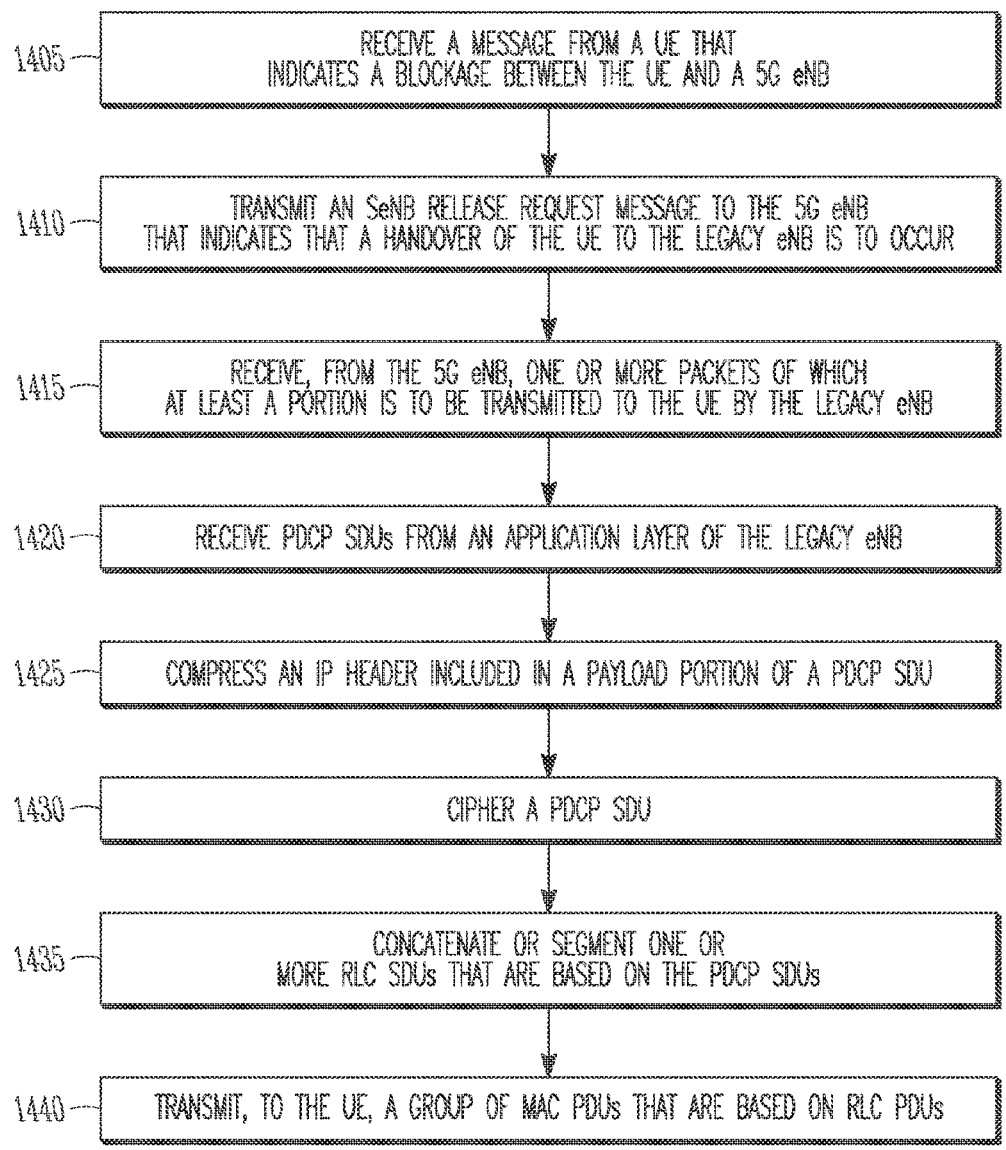
FIG. 14 illustrates the operation of another method of communication in accordance with some embodiments.

FIG. 13 illustrates the operation of another method of communication in accordance with some embodiments. FIG. 14 illustrates the operation of another method of communication in accordance with some embodiments. As mentioned previously regarding the method 600, embodiments of the methods 1300 and/or 1400 may include additional or even fewer operations or processes in comparison to what is illustrated in FIGS. 13 and/or 14. In some embodiments, one or more operations described herein may be included in methods 1300 and/or 1400, including operations that are not necessarily shown in FIGS. 13 and/or 14. Embodiments of the methods 1300 and/or 1400 are not necessarily limited to the chronological order that is shown in FIGS. 13 and/or 14. In describing the methods 1300 and/or 1400, reference may be made to any of FIGS. 1-12, although it is understood that the methods 1300 and/or 1400 may be practiced with any other suitable systems, interfaces and components. In addition, embodiments of the methods 1300 and/or 1400 may be applicable to UEs 102, eNBs 104, STAs, APs and/or other wireless or mobile devices. The methods 1300 and/or 1400 may be applicable to an apparatus for a UE 102, eNB 104, legacy eNB 515, 5G eNB 525, STA, AP and/or other wireless or mobile device, in some embodiments.

In some embodiments, the method 1300 may be practiced by a 5G eNB 525 or other base station. In some embodiments, the method 1400 may be practiced by a legacy eNB 515 or other base station. In some embodiments, the method 600 may be practiced by a UE 102 or other mobile device. It should be noted that one or more operations of one of the methods 600, 1300 and/or 1400 may be reciprocal to, similar to and/or related to one or more operations included in the other method. As an example, an operation of the method 1300 may include transmission of a packet by the 5G eNB 525, and an operation of the method 600 may include reception of the same packet or similar packet by the UE

102. As another example, an operation of the method 1400 may include transmission of a packet by the legacy eNB 515, and an operation of the method 600 may include reception of the same packet or similar packet by the UE 102. As another example, an operation of the method 1400 may include transmission of a message by the legacy eNB 515, and an operation of the method 1300 may include reception of the same message or similar message by the UE 102.

In addition, previous discussion of various techniques and concepts may be applicable to the methods 1300 and/or 1400 in some cases, including but not limited to PCLC layer, PCLC, operations, PCLC SNs, PCLC PDUs and SDUs, RLC layer, RLC operations, RLC SNs, RLC PDUs and SDUs, PDCP layer, PDCP operations, PDCP SNs, PDCP PDUs and SDUs, reordering, retransmissions, ciphering, deciphering, header compression, header decompression, other transmit operations, other receive operations and/or others may be applicable in some cases.

At operation 1305 of the method 1300, the 5G eNB 525 may receive one or more PCLC SDUs from an application layer of the 5G eNB. The PCLC SDUs may be received at the 5G eNB 525 for transmission to the UE 102, in some embodiments. The PCLC SDUs may be or may include IP packets, in some embodiments, although the scope of embodiments is not limited in this respect.

At operation 1310, the 5G eNB 525 may compress one or more headers included in payload portions of the PCLC SDUs. As an example, a payload portion of a PCLC SDU may include an IP packet with an IP header. The 5G eNB 525 may compress the IP header, and may do so in accordance with a PCLC SN of the PCLC SDU, in some embodiments. Techniques such as robust header compression (ROI-IC) and/or others may be used, in some cases.

At operation 1315, the 5G eNB 525 may concatenate or segment one or more PCLC SDUs. The 5G eNB 525 may cipher one or more PCLC SDUs at operation 1320. It should be noted that the cipher operation may be performed by the 5G eNB 525 on SDUs, segments of PCLC SDUs and/or concatenations of PCLC SDUs. The cipher operation may be performed in accordance with PCLC SNs, in some embodiments. For instance, cipher keys may be based at least partly on the PCLC SNs. The cipher keys may be further based at least partly on a hyper frame number (HFN) of the 5G eNB 525, in some cases.

At operation 1325, the 5G eNB 525 may assign one or more PCLC SNs. It should be noted that the 5G eNB 525 (and/or PCLC layer) may assign PCLC SNs to PCLC SDUs, segments of PCLC SDUs and/or concatenations of PCLC SDUs, in some embodiments. The assignment of the PCLC SNs may be performed before, during or after any operation, such as the operations shown in FIG. 13.

The 5G eNB 525 may generate one or more PCLC PDUs based on one or more PCLC SDUs at operation 1330. As a non-limiting example, a PCLP PDU may be based on one or more PCLC SDUs that may have been concatenated, segmented, ciphered and/or otherwise processed. The PCLC PDUs may also include PCLC SNs assigned by the PCLC layer.

At operation 1335, the 5G eNB 525 may transmit one or more MAC PDUs to the UE 102. In some embodiments, the MAC PDUs may be based on one or more PCLC PDUs. Although embodiments are not limited as such, the MAC PDUs transmitted by the 5G eNB 525 at operation 1335 may be the same as or similar to the first group of MAC PDUs received at the UE 102 at operation 605 of the method 600.

At operation 1340, the 5G eNB 525 may receive, from the legacy eNB 515, a handover message that indicates that a handover of the UE 102 from the 5G eNB 525 to the legacy eNB 515 is to occur. In some embodiments, the handover message may be or may include a secondary eNB (SeNB) release request message, which may be included in a 3GPP standard and/or other standard.

At operation 1345, the 5G eNB 525 may send, to the legacy UE and over interface circuitry, one or more packets of which at least a portion is to be transmitted to the UE 102 by the legacy eNB 515. As an example, a packet sent from the 5G eNB 525 may be a queued PCLC SDU for usage as a PDCP SDU by the legacy eNB 515. As another example, a packet sent from the 5G eNB 525 may be for usage as a PDCP SDU and may be based on an encapsulation of a queued PCLC PDU that was intended to be transmitted to the UE 102 by the 5G eNB 55.

Referring to FIG. 14, the method 1400 may be performed by a legacy eNB 515. Although references may be made to communication with a 5G eNB 525, it is understood that the legacy eNB 515 may communicate with another type of eNB 104 (such as a secondary eNB 104 and/or other) in some embodiments. As an example, the legacy eNB 515 may communicate with the UE 102 and with the 5G eNB 525 in accordance with an inter radio access technology (inter-RAT) arrangement (and/or other arrangement) in which the legacy eNB 515 serves as a primary eNB and the 5G eNB 525 serves as a secondary eNB (SeNB).

At operation 1405, the legacy eNB 515 may receive, from a UE 102, a message that indicates information such as a blockage between the UE 102 and a 5G eNB 525, an unavailability of the 5G eNB 525, a performance measurement (such as a throughput, error rate, signal quality measurement and/or other) of the link between the UE 102 and the 5G eNB 525 and/or other. In some cases, the message may indicate that the UE requests a handover back to the legacy eNB 515. At operation 1410, the legacy eNB 515 may transmit a message (such as an SeNB release request message and/or other message) to the 5G eNB 525 that indicates that a handover of the UE 102 to the legacy eNB 515 is to occur.

At operation 1415, the legacy eNB 515 may receive, from the eNB 525, one or more packets of which at least a portion is to be transmitted to the UE 102 by the legacy eNB 515. The packets may be similar to or the same as the packets sent by the 5G eNB 525 at operation 1345, in some embodiments. Accordingly, the packets from the 5G eNB 525 may be (or may be processed into) PDCP SDUs, in some cases. At operation 1420, the PDCP layer of the legacy eNB 515 may receive one or more PDCP SDUs, such as from an application layer of the legacy eNB 515 and/or other source. For instance, PDCP SDUs may be based on higher layer PDUs/SDUs received at the legacy eNB 515 from another component, such as IP packets and/or other packets. In some embodiments, PDCP SDUs processed by the legacy eNB 515, such as in operations 1425-1430 and/or others, may be received from the 5G eNB 525, from an upper layer and/or a combination thereof.

At operation 1425, the legacy eNB 515 may compress one or more headers included in payload portions of the PDCP SDUs. As an example, a payload portion of a PDCP SDU may include an IP packet with an IP header. The 5G eNB 525 may compress the IP header, and may do so in accordance with a PDCP SN of the PDCP SDU, in some embodiments. Techniques such as robust header compression (ROHC) and/or others may be used, in some cases.

At operation 1430, the legacy eNB 515 may cipher one or more SDUs. The cipher operation may be performed in accordance with PDCP SNs, in some embodiments. For instance, cipher keys may be based at least partly on the PDCP SNs. The cipher keys may be further based at least partly on a hyper frame number (HFN) of the legacy eNB 515, in some cases.

At operation 1435, the legacy eNB 515 may concatenate or segment one or more RLC SDUs. The RLC SDUs may be based on the PDCP SDUs, in some embodiments. The concatenation and/or segmentation may be performed in accordance with RLC SNs, in some embodiments.

At operation 1440, the legacy eNB 515 may transmit one or more MAC PDUs to the UE 102. In some embodiments, the MAC PDUs may be based on one or more RLC PDUs. Although embodiments are not limited as such, the MAC PDUs transmitted by the legacy eNB 515 at operation 1440 may be the same as or similar to the second group of MAC PDUs received at the UE 102 at operation 645 of the method 600.

It should be noted that embodiments may be described herein in terms of downlink communication, but embodiments are not limited to downlink communication. In some embodiments, some or all concepts, techniques, operations and/or methods described herein for the downlink communication may be applicable to uplink communication. In some embodiments, transmit operations such as concatenation, segmentation, ciphering, IP header compression and/or others described herein may be performed by an eNB 515, 525 as part of downlink communication with the UE 102. In an uplink communication, the UE 102 may perform one or more of those operations and/or similar operations, in some cases. In some embodiments, receive operations such as reassembly, deciphering, IP header decompression and/or others described herein may be performed by the UE 102 as part of the downlink communication. In an uplink communication, the legacy eNB 515, 5G eNB 525 and/or other eNB 104 may perform one or more of those operations and/or similar operations, in some cases.

In Example 1, an apparatus of a User Equipment (UE) may comprise memory. The apparatus may further comprise processing circuitry. The processing circuitry may be configured to, for a first group of medium access control (MAC) protocol data units (PDUs) that include packet convergence and link control (PCLC) PDUs: reorder the PCLC PDUs based on sequence numbers (SNs); and decipher, in accordance with decipher keys that are based at least partly on the PCLC SNs, the reordered PCLC PDUs to generate one or more PCLC service data units (SDUs). The processing circuitry may be further configured to, for a second group of MAC PDUs that include packet data convergence protocol (PDCP) PDUs encapsulated in radio link control (RLC) PDUs: reorder the RLC PDUs based on RLC SNs; and decipher, in accordance with decipher keys that are based at least partly on PDCP SNs that are exclusive to the RLC SNs, the reordered RLC PDUs to generate one or more PDCP SDUs.

In Example 2, the subject matter of Example 1, wherein the first group of MAC PDUs may be received from a Fifth Generation (5G) Evolved Node-B (eNB) while the UE is served by the 5G eNB. The second group of MAC PDUs may be received from a legacy eNB while the UE is served by the legacy eNB. The UE may be arranged to communicate with the 5G eNB and the legacy eNB in accordance with an inter radio access technology (inter-RAT) arrangement in which the legacy eNB serves as a primary eNB.

In Example 3, the subject matter of one or any combination of Examples 1-2, wherein the RLC SNs may be part of an RLC layer of a legacy protocol of the legacy eNB. The PDCP SNs may be part of a PDCP layer of the legacy protocol. The PCLC SNs may be part of a PCLC layer of a 5G protocol of the 5G eNB.

In Example 4, the subject matter of one or any combination of Examples 1-3, wherein the second group of MAC PDUs may be received after a handover of the UE from the 5G eNB to the legacy eNB.

In Example 5, the subject matter of one or any combination of Examples 1-4, wherein the first group of MAC PDUs may be received after a handover of the UE from a legacy network to a 5G network. The legacy eNB may operate in the legacy network and the 5G eNB operates in the 5G network. The processing circuitry may be further configured to determine, based at least partly on an unavailability of the 5G network, that the UE is to fall back from the 5G network to the legacy network. The second group of MAC PDUs may be received after a fall back of the UE to the legacy eNB.

In Example 6, the subject matter of one or any combination of Examples 1-5, wherein the first group of MAC PDUs may be received after a handover of the UE from the legacy eNB to the 5G eNB.

In Example 7, the subject matter of one or any combination of Examples 1-6, wherein the UE may be arranged to operate in accordance with a 5G protocol to receive the first group of MAC PDUs from the 5G eNB. The LTE may be further arranged to operate in accordance with a Third Generation Partnership Project (3GPP) Long Term Evolution (LTE) protocol to receive the second group of MAC PDUs from the legacy eNB.

In Example 8, the subject matter of one or any combination of Examples 1-7, wherein the processing circuitry may be further configured to determine, based at least partly on the PCLC SNs, whether any reception failures of PCLC PDUs from the 5G eNB have occurred. The processing circuitry may be further configured to encode, for transmission to the 5G eNB, a retransmission request that indicates the PCLC SNs of the PCLC PDUs for which the reception failures have occurred.

In Example 9, the subject matter of one or any combination of Examples 1-8, wherein the PCLC decipher keys may be further based at least partly on a hyper-frame number (HFN) of the 5G eNB for the first group of MAC PDUs.

In Example 10, the subject matter of one or any combination of Examples 1-9, wherein the deciphered, reordered PCLC PDUs may include PCLC header portions and PCLC payload portions. The processing circuitry may be further configured to, for a portion of the deciphered, reordered PCLC PDUs for which the PCLC payload portions include compressed internet protocol (IP) headers, decompress the IP headers. The header decompression may be based at least partly on the PCLC SNs of the deciphered, reordered PCLC PDUs.

In Example 11, the subject matter of one or any combination of Examples 1-10, wherein the processing circuitry may be further configured to determine, based at least partly on concatenation/segmentation indicators of the PCLC PDUs, whether the PCLC PDUs have been concatenated or segmented. The processing circuitry may be further configured to reassemble one or more PCLC PDUs determined to have been concatenated or segmented.

In Example 12, the subject matter of one or any combination of Examples 1-11, wherein the processing circuitry may be further configured to, for the first group of MAC PDUs, forward the PCLC SDUs to an application layer of the UE as internet protocol (IP) packets. The processing circuitry may be further configured to, for the second group of MAC PDUs, forward the PDCP SDUs to the application layer of the UE as IP packets.

In Example 13, the subject matter of one or any combination of Examples 1-12, wherein the apparatus may further include a transceiver to receive the first and second groups of MAC PDUs.

In Example 14, the subject matter of one or any combination of Examples 1-13, wherein the processing circuitry may include a baseband processor to reorder the PCLC PDUs, to decipher the reordered PCLC PDUs, to reorder the RLC PDUs, and to decipher the reordered RLC PDUs.

In Example 15, a computer-readable storage medium may store instructions for execution by one or more processors to perform operations for communication by a User Equipment (UE). The operations may configure the one or more processors to reorder a group of packet convergence and link control (PCLC) protocol data units (PDUs) based at least partly on PCLC sequence numbers (SNs) of the PCLC PDUs. The operations may further configure the one or more processors to decipher the reordered PCLC PDUs in accordance with decipher keys that are based at least partly on the PCLC SNs. The operations may further configure the one or more processors to generate, based on the reordered, deciphered PCLC PDUs, one or more PCLC service data units (SDUs) for usage by an application layer of the UE. The PCLC PDUs may be based on medium access control (MAC) PDUs received from a Fifth Generation (5G) Evolved Node-B (eNB).

In Example 16, the subject matter of Example 15, wherein the operations are to further configure the one or more processors to, when at least one of the deciphered PCLC PDUs is based on a concatenation, at the 5G eNB, of outbound PCLC SDUs, reassemble the deciphered PCLC PDU as part of the generation of the PCLC SDUs for usage by the application layer of the UE.

In Example 17, the subject matter of one or any combination of Examples 15-16, wherein the operations are to further configure the one or more processors to, when a group of deciphered PCLC PDUs is based on a segmentation, at the 5G eNB, of an outbound PCLC SDU, reassemble the group of deciphered PCLC PDUs as part of the generation of the PCLC SDUs for usage by the application layer of the UE.

In Example 18, the subject matter of one or any combination of Examples 15-17, wherein the operations to further configure the one or more processors to, when at least one of the deciphered PCLC PDUs is based on a concatenation, at the 5G eNB, of a first group of outbound PCLC SDUs and further based on one or more segments of a second PCLC SDU: reassemble the deciphered PCLC PDU as part of the generation of the PCLC SDUs for usage by the application layer of the UE.

In Example 19, the subject matter of one or any combination of Examples 15-18, wherein the operations are to further configure the one or more processors to, when the UE receives MAC PDUs from a legacy eNB: reorder radio link control (RLC) PDUs that are based on the MAC PDUs from the legacy eNB, the RLC PDUs reordered based on RLC SNs of the RLC PDUs; decipher packet data convergence protocol (PDCP) PDUs that are based on the reordered RLC PDUs, the PDCP PDUs deciphered based on PDCP SNs of the PDCP PDUs that are exclusive to the RLC SNs; and generate, based on the deciphered PDCP PDUs, one or more PDCP SDUs for usage by the application layer of the UE.

In Example 20, the subject matter of one or any combination of Examples 15-19, wherein the PCLC SDUs and the PDCP SDUs may be based on internee protocol (IP) packets.

In Example 21, an apparatus of a Fifth Generation (5G) Evolved Node-B (eNB) may comprise memory. The apparatus may further comprise processing circuitry. The processing circuitry may be further configured to concatenate a group of packet convergence and link control (PCLC) service data units (SDUs). The processing circuitry may be further configured to assign a PCLC sequence number (SN) to the concatenation. The processing circuitry may be further configured to cipher the concatenation in accordance with a PCLC cipher key that is based at least partly on the assigned PCLC SN. The processing circuitry may be further configured to encode, for transmission to a User Equipment (UE), a medium access control (MAC) PDU that is based on the ciphered concatenation and is further based on the assigned PCLC SN.

In Example 22, the subject matter of Example 21, wherein the processing circuitry may be further configured to determine, based on a handover message received from a legacy eNB, that a handover of the UE from the 5G eNB to the legacy eNB is to occur. The processing circuitry may be further configured to encode, for communication to the legacy eNB over interface circuitry, a packet data convergence protocol (PDCP) service data unit (SDU) based on an encapsulation of a queued PCLC PDU that is to be transmitted to the UE.

In Example 23, the subject matter of one or any combination of Examples 21-22, wherein the processing circuitry may be further configured to determine, based on a handover message received from a legacy eNB, that a handover of the UE from the 5G eNB to the legacy eNB is to occur. The processing circuitry may be further configured to encode, for communication to the legacy eNB over interface circuitry, a queued PCLC service data unit (SDU) for usage as a packet data convergence protocol (PDCP) SDU by the legacy eNB.

In Example 24, an apparatus of a legacy Evolved Node-B (eNB) may comprise memory. The apparatus may further comprise processing circuitry. The processing circuitry may be configured to encode, for transmission to a secondary eNB (SeNB), an SeNB release request message that indicates that a handover of a User Equipment (UE) from the SeNB to the legacy eNB is to occur. The processing circuitry may be configured to determine a packet data convergence protocol (PDCP) service data unit (SDU) based on an SeNB packet received from the SeNB over the interface circuitry. The processing circuitry may be configured to determine a PDCP PDU based at least partly on the PDCP SDU and a PDCP sequence number (SN) for the PDCP SDU. The processing circuitry may be configured to encode, for transmission to the UE, a medium access control PDU that is based on the PDCP PDU.

In Example 25, the subject matter of Example 24, wherein the processing circuitry may be further configured to determine that the handover is to occur based at least partly on a performance indicator, received from the UE, that indicates a blockage between the UE and the SeNB.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a User Equipment (UE), the apparatus comprising:
processing circuitry; and
memory, wherein one or more processors of the processing circuitry are configured to:
reorder a group of packet convergence and link control (PCLC) protocol data units (PDUs) based at least partly on PCLC sequence numbers (SNs) of the PCLC PDUs;
after reordering the group of PCLC PDUs, decipher the reordered PCLC PDUs in accordance with decipher keys that are based at least partly on the PCLC SNs; and
generate, based on the reordered, deciphered PCLC PDUs, one or more PCLC service data units (SDUs) for usage by an application layer of the UE,
wherein the PCLC PDUs are received from a PCLC layer of the UE, the PCLC layer comprising a single layer having functionality of both a radio link control (RLC) layer and a Package Data Converge Protocol (PDCP) layer,
wherein the PCLC PDUs are based on medium access control (MAC) PDUs received from a Fifth Generation (5G) Evolved Node-B (eNB), and
wherein when a group of deciphered PCLC PDUs is based on a segmentation, at the 5G eNB, of an outbound PCLC SDU, the processing circuitry is further configured to reassemble the group of deciphered PCLC PDUs as part of the generation of the PCLC SDUs for usage by the application layer of the UE, and
wherein the memory is configured to store the group of PCLC PPDUs.

2. The apparatus according to claim 1, wherein when at least one of the deciphered PCLC PDUs is based on a concatenation, at the 5G eNB, of outbound PCLC SDUs, the processing circuitry is further configured to reassemble the deciphered PCLC PDU as part of the generation of the PCLC SDUs for usage by the application layer of the UE.

3. The apparatus according to claim 1, wherein when at least one of the deciphered PCLC PDUs is based on a concatenation, at the 5G eNB, of a first group of outbound PCLC SDUs and further based on one or more segments of a second PCLC SDU, the processing circuitry is further configured to reassemble the deciphered PCLC PDU as part of the generation of the PCLC SDUs for usage by the application layer of the UE.

4. The apparatus according to claim 1, wherein when the UE receives MAC PDUs from a legacy eNB, the processing circuitry is further configured to:
reorder radio link control (RLC) PDUs that are based on the MAC PDUs from the legacy eNB, the RLC PDUs reordered based on RLC SNs of the RLC PDUs;
decipher packet data convergence protocol (PDCP) PDUs that are based on the reordered RLC PDUs, the PDCP PDUs deciphered based on PDCP SNs of the PDCP PDUs that are exclusive to the RLC SNs; and
generate, based on the deciphered PDCP PDUs, one or more PDCP SDUs for usage by the application layer of the UE.

5. The apparatus according to claim 4, wherein the PCLC SDUs and the PDCP SDUs are based on internet protocol (IP) packets.

6. The apparatus of claim 5, wherein the processing circuitry comprises a baseband processor.

7. An apparatus for a User Equipment (UE), the apparatus comprising:
processing circuitry; and memory, wherein one or more processors of the processing circuitry are configured to:
reorder a group of packet convergence and link control (PCLC) protocol data units (PDUs) based at least partly on PCLC sequence numbers (SNs) of the PCLC PDUs;
after reordering the group of PCLC PDUs, decipher the reordered PCLC PDUs in accordance with decipher keys that are based at least partly on the PCLC SNs; and
generate, based on the reordered, deciphered PCLC PDUs, one or more PCLC service data units (SDUs) for usage by an application layer of the UE,
wherein the PCLC PDUs are based on medium access control (MAC) PDUs received from a Fifth Generation (5G) Evolved Node-B (eNB), and
wherein the memory is configured to store the group of PCLC PPDUs,
wherein when the UE receives MAC PDUs from a legacy eNB, the processing circuitry is further configured to:
reorder radio link control (RLC) PDUs that are based on the MAC PDUs from the legacy eNB, the RLC PDUs reordered based on RLC SNs of the RLC PDUs,
decipher packet data convergence protocol (PDCP) PDUs that are based on the reordered RLC PDUs, the PDCP PDUs deciphered based on PDCP SNs of the PDCP PDUs that are exclusive to the RLC SNs, and
generate, based on the deciphered PDCP PDUs, one or more PDCP SDUs for usage by the application layer of the UE,
wherein the PCLC SDUs and the PDCP SDUs are based on internet protocol (IP) packets,
wherein the processing circuitry comprises a baseband processor, and
wherein the UE further comprises a transceiver configured to be coupled to two or more antennas, and wherein the processing circuitry is configured to receive the MAC PDUs from the transceiver.

8. A non-transitory computer-readable storage medium that stores instructions for execution by one or more processors to perform operations for communication by a User Equipment (UE), the operations to configure the one or more processors to:
reorder a group of packet convergence and link control (PCLC) protocol data units (PDUs) based at least partly on PCLC sequence numbers (SNs) of the PCLC PDUs;
after reordering the group of PCLC PDUs, decipher the reordered PCLC PDUs in accordance with decipher keys that are based at least partly on the PCLC SNs; and
generate, based on the reordered, deciphered PCLC PDUs, one or more PCLC service data units (SDUs) for usage by an application layer of the UE,
wherein the PCLC PDUs are received from a PCLC layer of the UE, the PCLC layer comprising a single layer having functionality of both a radio link control (RLC) layer and a Package Data Converge Protocol (PDCP) layer,
wherein the PCLC PDUs are based on medium access control (MAC) PDUs received from a Fifth Generation (5G) Evolved Node-B (eNB), and
wherein when a group of deciphered PCLC PDUs is based on a segmentation, at the 5G eNB, of an outbound PCLC SDU, the processing circuitry is further configured to reassemble the group of deciphered PCLC PDUs as part of the generation of the PCLC SDUs for usage by the application layer of the UE.

9. The non-transitory computer-readable storage medium according to claim 8, the operations to further configure the one or more processors to, when at least one of the deciphered PCLC PDUs is based on a concatenation, at the 5G eNB, of outbound PCLC SDUs:
reassemble the deciphered PCLC PDU as part of the generation of the PCLC SDUs for usage by the application layer of the UE.

10. The non-transitory computer-readable storage medium according to claim 8, the operations to further configure the one or more processors to, when at least one of the deciphered PCLC PDUs is based on a concatenation, at the 5G eNB, of a first group of outbound PCLC SDUs and further based on one or more segments of a second PCLC SDU:
reassemble the deciphered PCLC PDU as part of the generation of the PCLC SDUs for usage by the application layer of the UE.

11. The non-transitory computer-readable storage medium according to claim 8, the operations to further configure the one or more processors to:
when the UE receives MAC PDUs from a legacy eNB:
reorder radio link control (RLC) PDUs that are based on the MAC PDUs from the legacy eNB, the RLC PDUs reordered based on RLC SNs of the RLC PDUs;
decipher packet data convergence protocol (PDCP) PDUs that are based on the reordered RLC PDUs, the PDCP PDUs deciphered based on PDCP SNs of the PDCP PDUs that are exclusive to the RLC SNs; and
generate, based on the deciphered PDCP PDUs, one or more PDCP SDUs for usage by the application layer of the UE.

12. The non-transitory The computer-readable storage medium according to claim 11, wherein the PCLC SDUs and the PDCP SDUs are based on internet protocol (IP) packets.

* * * * *